(12) United States Patent
Yerli

(10) Patent No.: US 11,079,897 B2
(45) Date of Patent: Aug. 3, 2021

(54) TWO-WAY REAL-TIME 3D INTERACTIVE OPERATIONS OF REAL-TIME 3D VIRTUAL OBJECTS WITHIN A REAL-TIME 3D VIRTUAL WORLD REPRESENTING THE REAL WORLD

(71) Applicant: THE CALANY HOLDING S. À R.L., Luxembourg (LU)

(72) Inventor: Cevat Yerli, Frankfurt am Main (DE)

(73) Assignee: THE CALANY HOLDING S. À R.L., Luxembourg (LU)

( * ) Notice: Subject to any disclaimer, the term of this patent is extended or adjusted under 35 U.S.C. 154(b) by 0 days.

(21) Appl. No.: 16/421,199

(22) Filed: May 23, 2019

(65) Prior Publication Data

US 2019/0361589 A1 Nov. 28, 2019

Related U.S. Application Data

(60) Provisional application No. 62/676,124, filed on May 24, 2018.

(51) Int. Cl.
*G06F 3/0481* (2013.01)
*G06T 19/20* (2011.01)

(52) U.S. Cl.
CPC .......... *G06F 3/04815* (2013.01); *G06T 19/20* (2013.01); *G06T 2200/04* (2013.01); *G06T 2200/24* (2013.01); *G06T 2219/2016* (2013.01)

(58) Field of Classification Search
CPC ................ G06F 3/04815; G06T 19/20; G06T 2219/2016; G06T 2200/24; G06T 2200/04
See application file for complete search history.

(56) References Cited

U.S. PATENT DOCUMENTS 5,883,817 A 3/1999 Chisholm et al.
5,956,039 A 9/1999 Woods et al.
(Continued)

FOREIGN PATENT DOCUMENTS

CN 100484726 C 5/2009
CN 102120325 A 7/2011
(Continued)

OTHER PUBLICATIONS

Extended European Search Report datedSep. 14, 2020, issued in European Application No. 20176245.7, 8 pages.
(Continued)

*Primary Examiner* — Anil K Bhargava
(74) *Attorney, Agent, or Firm* — Christensen O'Connor Johnson Kindness PLLC

(57) ABSTRACT

A system and method enabling two-way interactive operations of real-time 3D virtual replicas and real objects are described. The system includes a persistent virtual world system comprising a data structure in which at least one real-time 3D virtual replica of a real object is represented, which is stored and computed on a server; at least one corresponding real objects connected to the real-time 3D virtual replica via a network through the persistent virtual world system stored and computed on the server: and at least one user device connected to the real object via the network through the virtual world system stored and computed on the server. Virtually selecting and thereafter effecting changes on the real-time 3D virtual replica results in a real-time corresponding effect on the real object. Likewise, effecting one or more changes on the real object results in a real-time corresponding effect on the real-time 3D virtual replica.

20 Claims, 9 Drawing Sheets

(56) References Cited

U.S. PATENT DOCUMENTS

| | | |
|---|---|---|
| 6,278,479 B1 | 8/2001 | Wilson et al. |
| 6,556,206 B1 | 4/2003 | Benson et al. |
| 7,168,051 B2 | 1/2007 | Robinson et al. |
| 7,529,690 B2 | 5/2009 | Hadi |
| 8,326,704 B2 | 12/2012 | Glazer et al. |
| 8,564,621 B2 | 10/2013 | Branson et al. |
| 9,281,727 B1 | 3/2016 | Coley et al. |
| 9,511,291 B2 | 12/2016 | Lyons et al. |
| 9,669,321 B2 | 6/2017 | Reveley |
| 9,704,298 B2 | 7/2017 | Espeset et al. |
| 9,721,386 B1 | 8/2017 | Worley, III et al. |
| 10,565,764 B2 | 2/2020 | Han et al. |
| 2002/0116235 A1 | 8/2002 | Grimm et al. |
| 2002/0191017 A1 | 12/2002 | Sinclair et al. |
| 2003/0030658 A1 | 2/2003 | Gibbs et al. |
| 2006/0122917 A1 | 6/2006 | Lokuge et al. |
| 2006/0184886 A1 | 8/2006 | Chung et al. |
| 2007/0168463 A1 | 7/2007 | Rothschild |
| 2008/0263460 A1 | 10/2008 | Altberg et al. |
| 2009/0055019 A1 | 2/2009 | Stiehl et al. |
| 2009/0244059 A1 | 10/2009 | Kulkarni et al. |
| 2009/0326713 A1 | 12/2009 | Moriya |
| 2010/0131865 A1 | 5/2010 | Ackley et al. |
| 2010/0131947 A1 | 5/2010 | Ackley et al. |
| 2011/0060425 A1* | 3/2011 | Freed .............. G06N 5/04 700/34 |
| 2012/0038667 A1 | 2/2012 | Branson et al. |
| 2012/0133638 A1 | 3/2012 | Davison et al. |
| 2012/0105475 A1 | 5/2012 | Tseng |
| 2012/0149349 A1 | 6/2012 | Quade |
| 2013/0009994 A1 | 1/2013 | Hill |
| 2013/0044106 A1 | 2/2013 | Shuster et al. |
| 2013/0117377 A1 | 5/2013 | Miller |
| 2013/0179576 A1 | 7/2013 | Boldyrev et al. |
| 2014/0063061 A1 | 3/2014 | Reitan |
| 2014/0214504 A1 | 7/2014 | Young et al. |
| 2014/0221090 A1* | 8/2014 | Mutschler ......... G02B 27/017 463/31 |
| 2014/0282220 A1 | 9/2014 | Wantland et al. |
| 2015/0188984 A1 | 7/2015 | Mullins |
| 2016/0300392 A1 | 10/2016 | Jonczyk et al. |
| 2016/0343168 A1 | 11/2016 | Mullins et al. |
| 2016/0379415 A1* | 12/2016 | Espeset ............. G06T 7/20 345/633 |
| 2017/0092223 A1 | 3/2017 | Fain et al. |
| 2017/0203438 A1* | 7/2017 | Guerin ............. B25J 9/1605 |
| 2017/0243403 A1 | 8/2017 | Daniels et al. |
| 2017/0250930 A1 | 8/2017 | Ben-Itzhak |
| 2017/0286572 A1 | 10/2017 | Hershey et al. |
| 2017/0287496 A1 | 10/2017 | Heitkamp et al. |
| 2017/0289202 A1 | 10/2017 | Krasadakis |
| 2017/0358024 A1 | 12/2017 | Mattingly et al. |
| 2018/0040038 A1 | 2/2018 | Vanslette et al. |
| 2018/0047093 A1 | 2/2018 | High et al. |
| 2018/0060948 A1 | 3/2018 | Mattingly et al. |
| 2018/0089903 A1 | 3/2018 | Pang |
| 2018/0173309 A1 | 6/2018 | Uchiyama et al. |
| 2018/0210436 A1 | 7/2018 | Burd et al. |
| 2018/0231973 A1 | 8/2018 | Mattingly et al. |
| 2018/0281193 A1* | 10/2018 | Favis ............. G06T 19/20 |
| 2018/0342106 A1 | 11/2018 | Rosado |
| 2018/0349108 A1 | 12/2018 | Brebner |
| 2019/0065028 A1 | 2/2019 | Chashchin-Semenov et al. |
| 2019/0102494 A1 | 4/2019 | Mars |
| 2019/0102709 A1 | 4/2019 | Correa |
| 2019/0221036 A1 | 7/2019 | Griffin et al. |
| 2019/0361797 A1 | 11/2019 | Yerli |
| 2020/0209949 A1 | 7/2020 | Noris et al. |
| 2020/0210137 A1 | 7/2020 | Noris et al. |
| 2020/0211251 A1 | 7/2020 | Noris et al. |

FOREIGN PATENT DOCUMENTS

| | | |
|---|---|---|
| CN | 102120325 B | 12/2012 |
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 10-1670147 B1 | 11/2016 |
| KR | 1020180020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

Notice of Grounds for Preliminary Rejection dated Jul. 22, 2020, issued in Korean Application No. 10-2019-0060413, filed May 23, 2019, 12 pages.

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

European Search Report dated Jan. 17, 2020, in European Application No. 19176436.4, filed May 24, 2019, 83 pages.

Partial European Search Report dated Sep. 9, 2019, in European Application No. 19176436.4, filed May 24, 2019, 18 pages.

Alsamhi, S.H., et al, "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1 10.

Massachusetts Institute of Technology, "Huggable", Jul. 17, 2013, <http://www.youtube.com/watch?v=Z-8_RhkdvoA> [retrieved Sep. 6, 2019], 2 pages.

Office Action dated Aug. 26, 2020, issued in U.S. Appl. No. 16/903,235, filed Jun. 16, 2020, 21 pages.

Office Action dated Aug. 24, 2020, issued in U.S. Appl. No. 16/903,239, filed Jun. 16, 2020, 19 pages.

European Search Report dated Nov. 18, 2020, issued in European Application No. 20180856.5, 12 pages.

European Search Report dated Nov. 17, 2020, issued in European Application No. 20180736.9, 13 pages.

European Search Report dated Oct. 27, 2020, issued in European Application No. 20180712.0, 11 pages.

Extended European Search Report dated Nov. 16, 2020, issued in European Application No. 20180885.4, 12 pages.

Extended European Search Report dated Nov. 18, 2020, issued in European Application No. 20180739.3, 12 pages.

Extended European Search Report dated Nov. 18, 2020, issued in European Application No. 20180723.7, 12 pages.

Extended European Search Report dated Nov. 19, 2020, issued in European Application No. 20180869.8, 9 pages.

Yang, X., et al., "Virtual Reality Tools for Internet-Based Robotic Teleoperation", Proceedings of the Eighth IEEE International Symposium on Distributed and Real-Time Applications, 2004, 5 pages.

Asanuma, K., et al., "User Interface for Remote Operation of a Moving Robot via Internet", 9 pages.

Office Action issued in Japanese Application No. 2019096678, 3 pages.

Office Action dated Jan. 11, 2021, issued in U.S. Appl. No. 16/903,239, filed Jun. 16, 2020, 28 pages.

Office Action dated Jan. 11, 2021, issued in U.S. Appl. No. 16/903,235, filed Jun. 16, 2020, 26 pages.

Notice of Allowance dated Feb. 5, 2021, issued in U.S. Appl. No. 16/882,080, filed May 22, 2020, 7 pages.

(56) References Cited

OTHER PUBLICATIONS

Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.
Korean Office Action dated May 26, 2020, issued in corresponding KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Office Action dated Feb. 12, 2021, in U.S. Appl. No. 16/421,155, filed May 23, 2019, 26 pages.
Office Action dated Nov. 19, 2020, issued in Japanese Application No. 2019096980, 42 pages.
Web+DB Press, vol. 32, May 25, 2006, ISBN 4-7741-2752-3, p. 10-17.
Yoshiyuki Hashimoto, "iOS iBeacon/GeoFence/Navi/CoreMotion/M7" (Japanese version), Mar. 1, 2014, ISBN 978-4-7980-4070-7, pp. 82-94.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.

\* cited by examiner

TWO-WAY REAL-TIME 3D INTERACTIVE OPERATIONS OF REAL-TIME 3D VIRTUAL OBJECTS WITHIN A REAL-TIME 3D VIRTUAL WORLD REPRESENTING THE REAL WORLD

CROSS-REFERENCE TO RELATED APPLICATION

This application claims the benefit of Provisional Application No. 62/676,124, filed May 24, 2018, the entire disclosure of which is hereby incorporated by reference herein for all purposes.

FIELD

Aspects of the present disclosure relate generally to computer systems, and particularly to systems and method for enabling two-way interactive operations of real-time 3D virtual replicas and real objects.

BACKGROUND

Currently, industries such as manufacturing, military, and automobiles benefit from control technologies that enable monitoring along with passive and active management of the different objects involved. The various objects in a manufacturing process, for example, are usually managed remotely via computers in a workstation. These workstations have, in recent times, been upgraded from fixed computers to mobile devices that provide more user friendly and flexible Human Machine Interfaces (HMI).

Nevertheless, although most of the objects of interest may be visible and manageable from the workstation, interaction with these objects may still not be performed in a natural way. For example, the user experience (UX) may include several buttons enabling users to operate the objects, which may tend to become cumbersome when a high number of control buttons is involved. In addition, changes that occur to real objects of interest may not be fully synchronized to include a majority of details that may be needed for effective monitoring and management. Cooperation between the different elements is typically limited to a reduced number of objects, in many cases requiring vast amounts of human interaction. Furthermore, digital reality technologies, such as augmented reality and virtual reality, which present opportunities for applications requiring control technologies, have not been fully utilized for facilitating efficient management.

Therefore, there is a need to develop systems and methods that enable a more synchronized communication and interaction with and between real objects.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure provides a system and method enabling a natural control and real-time 3D-based interaction with and between real objects via an interface through an accurate virtual replica of the real objects, and a synchronized control of the virtual replica by directly controlling the real objects. In the current disclosure, the term "real object" refers to any physical object, device, or machine that can be connected to a network and remotely controlled, modified, or configured in some physical way. In some embodiments, a real object receives sensory information from a plurality of sources. In some embodiments, real objects may be communicatively connected to each other or to other devices via a network in an Internet of Things (IoT) arrangement, and in such an arrangement such devices are referred to as IoT devices. The accurate virtual replica may refer to a real-time 3D virtual replica of the real object, and may be synchronized with the real object to include identical or almost identical physical properties and real-world coordinates including real-world position and orientation through shared data points. For example, a direct manipulation of a real-time 3D virtual replica may be useful to remotely manage a plurality of industrial machines or vehicles in real-time. Similarly, by way of example, a direct manipulation of an industrial machine may be useful when a process administrator or machine operator requires a real-time, continuously updated model displaying and managing all objects in a system. The pair of real object and real-time 3D virtual replica may be referred to herein as a virtual twin, virtual-real pair, or real-virtual pair. Further applications of the disclosed system and method may be enabled by the real-time 3D virtual replica being provided through digital realities that may change the perception of users with respect to the real world, such as augmented reality, virtual reality, or mixed reality. The systems and methods of the current disclosure may be suitable for management of operations at different levels of complexity, such as within a factory or home, a neighborhood, a city, a country, and beyond. Further uses and benefits of the current disclosure may become evident in the different embodiments described in this Summary and in the detailed description below.

A system enabling two-way real-time 3D interactive operations of real objects and respective 3D real-time virtual replicas of the current disclosure includes a persistent virtual world system comprising a data structure in which at least one real-time 3D virtual replica of at least one corresponding real object is represented, wherein the persistent virtual world system is stored and computed on a server; at least one corresponding real object communicatively and persistently connected to the at least one real-time 3D virtual replica via a network through the persistent virtual world system stored and computed on the server; and at least one user device communicatively and persistently connected to the one or more real objects via the network through the persistent virtual world system stored and computed on the server. The at least one real-time 3D virtual replica is synchronized to the at least one corresponding real object through a plurality of sensing mechanisms providing a plurality of data points that are shared between the at least one real object and the at least one real-time 3D virtual replica. Furthermore, the virtual physical properties and virtual world coordinates of the at least one real-time 3D virtual replica correspond to the physical properties and real-world coordinates of the corresponding one or more real objects. The plurality of sensing mechanisms may be a combination of IoT sensing mechanisms providing a plurality of data points shared between the virtual-real pair.

Upon effecting one or more changes on either of the at least one real-time 3D virtual replica or corresponding real object via suitable interfaces, the server may, in real-time or non-real-time, process the manipulation instructions to enable management of the real world via the virtual world. The server may thereafter transmit those processed instructions to the respective target real object or respective real-time 3D virtual replica. More specifically, virtually selecting a real-time 3D virtual replica and thereafter effecting one or more changes on the real-time 3D virtual replica through the at least one user device results in a real-time corresponding effect on the corresponding real object. Likewise, effecting one or more changes on the real object results in a real-time corresponding effect on the real-time 3D virtual replica.

According to an aspect of the current disclosure, the direction of the manipulations of real objects and real-time 3D virtual replicas is bidirectional. For example, the manipulations may be generated as data and instructions resulting from the interaction of a user with at least one real-time 3D virtual replica in order to control the corresponding real object, or from the interaction of an object operator with at least one real object to have a direct effect on the corresponding real-time 3D virtual replica. However, the interactions may occur between the real-time 3D virtual replicas themselves when collaboration between real objects may be required, such as in control and management of drones, autonomous vehicles, robots, buildings in a city (e.g., virtual building managers communicating to each other), machine and computer vision applications, personal assistants, video games, and the like, as a result of artificial intelligence, group analytics, simulations and contextual computations. According to an embodiment, manipulating the at least one real-time 3D virtual replica or the corresponding at least one real object generates a change on contextual data affecting the virtual-real pair, wherein such a change in the contextual data may affect the relationships between real-time 3D virtual replicas corresponding to at least one real object. The term "context" or "contextual data", as used in the current disclosure, refers to data related to the direct or indirect environment of a real-time 3D virtual replica and its corresponding real object, including other objects in the environment of the real object. In the current disclosure, the context can be further classified into micro-context and macro-context.

The term "micro-context" refers to the context immediately surrounding a real object, such as any people, objects, or conditions that may directly affect the real world element. Micro-context may include, for example, data such as 3D image data, 3D geometries, 3D entities, 3D sensory data, 3D dynamic objects, video data, audio data, textual data, time data, metadata, priority data, security data, positional data, lighting data, temperature data, and quality of service (QOS), amongst others, of the environment immediately surrounding and affecting a real object. The term "macro-context" refers to the indirect or more distant context surrounding a real object. The macro context may be derived by the server from a plurality of micro-contexts, giving rise to more holistic information of a system, such as the current efficiency of a manufacturing plant, air quality, climate change levels, company efficiency, traffic levels, city efficiency, country efficiency, etc. The macro context may be considered and computed at different levels depending on the specified machine learning function and goals, including local level (e.g., office or manufacturing plant), neighborhood level, city level, country level, or even planet level. Thus, depending on the specified machine learning functions and goals, the same real world element data and micro context data may derive different types of macro-contexts.

In some embodiments, the network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

According to an embodiment, the network may comprise antennas configured to transmit and receive radio waves that enable mobile communication between the real objects and with the server. Antennas may be connected through wired or wireless means to computing centers. In other embodiments, the antennas are provided within the computing centers and/or areas near the computing centers. In some embodiments, in order to service user devices and/or real objects located outdoors, the antennas may include millimeter wave (mmW)-based antenna systems or a combination of mmW-based antennas and sub-6 GHz antenna systems, herein grouped as and referred to as 5G antennas. In other embodiments, the antennas may include other types of antennas, such as 4G antennas, or may be used as support antennas for the 5G antenna systems. In embodiments where antennas used for servicing real-time 3D-based interaction devices located indoors, the antennas may use Wi-Fi, preferably, but not limited to, providing data at 16 GHz.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 16 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

According to an embodiment, the servers may be provided as hardware and software including at least a processor and a memory, wherein the processor may be configured to execute instructions included in a memory coupled to the server, and wherein the memory is configured to store instructions and data. For example, the processor may be configured to implement artificial intelligence algorithms for management of the at least one real object via the corresponding real-time 3D virtual replicas, simulations of the real objects, 3D structure processing, contextual computations, group analytics, rendering, and implementation of virtual enhancements or virtual compensations of the real counterparts via the real-time 3D virtual replicas. In some embodiments, the processor further enables two-way interactive operations of real objects and real-time 3D virtual replicas by performing kinematic computations on the manipulation instructions in order to synchronize the movements of the virtual and real pair. In an embodiment, processing of manipulation instructions by the server processor is complementary of the processing performed by the one or more real objects via their own processor, serving as a support to real objects for performing certain heavy task processing. In other embodiments, the processor further performs rendering of media content comprising video and audio streams that are transmitted to users. The processor may further determine two or more media streams to be delivered to user devices based on the user viewing position, orientation, and/or viewing angles.

The memory may store the persistent virtual world system comprising the digital version of the real-world, including real-world coordinates, such as position, orientation, scale and dimension of real-world objects, the physical properties, and the 3D structure of each of the real objects in the form of real-time 3D virtual replicas. The memory may further comprise a content or virtual replica editor configured to enable users to create and edit the real-time 3D virtual replicas of the real object. However, the persistent virtual world system may further include computer-generated virtual objects that may not exist in the real world, such as objects that are purely virtual. In some embodiments, the persistent virtual world system is shared by two or more users, meaning that any change in one or more real-time 3D virtual replicas within the persistent virtual world system is viewable by the two or more users.

In the current disclosure, the term "persistent" is used to characterize a state of a system that can continue to exist without a continuously executing process or network connection. For example, the term "persistent" may be used to characterize the virtual world system where the virtual world system and all of the real-time 3D virtual replicas therein comprised continue to exist after the processes used for creating the real-time 3D virtual replicas cease, and independent of users being connected to the virtual world system. Thus, the virtual world system is saved in non-volatile storage location in the server. In this way, the real-time 3D virtual replicas may interact and collaborate with each other when being configured for accomplishing specific goals even if users are not connected to the server.

In some embodiments, the memory may further store events in the persistent virtual world system. Storing events may enable, for example, an occurrence detection module to detect and replay events for further review. An occurrence refers to a disruption in the typical flow of events. The typical flow of events may be determined within a parameter range or characteristics. In further embodiments, the occurrence is identified via a rule-based system implemented in the server. In other embodiments, the occurrence is identified through machine-learning algorithms implemented in the server.

The memory may be of any suitable type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. The memory may include temporary storage in addition to persistent storage. Instructions may be executed directly (e.g., machine code), or indirectly (e.g., scripts) by the processor. The instructions may be stored in object code format for direct processing by the processor, or in any other computer language including scripts or collections of independent source code modules that may be interpreted on demand or compiled in advance. Data may be retrieved, stored, or modified by the processor in accordance with the instructions. Data may, for example, be stored in computer registers, in a relational database as a table having a plurality of different fields and records, XML documents, or flat files, for example. The data may also be formatted in any computer-readable format. The processor may refer to a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), micro-processors, micro-controllers, and the like.

According to an embodiment, the replica editor stored in the memory of the server comprises software and hardware configured to enable users to model and edit the real-time 3D virtual replicas of the real objects. The replica editor may be, for example, a computer-aided drawing (CAD) software application that may store data and instructions necessary to input and edit virtual replicas. The replica editor may enable the input of explicit data and instructions that relate to each digital replica, which refers to data and instructions that describe the shape, location, position and orientation, physical properties, 3D structure, and the expected functioning and impact of each real-time 3D virtual replica and the persistent virtual world system as a whole. Generally, the explicit data may include data that may not be obtained by the sensing mechanisms but which instead may need to be input digitally through the replica editor, such as building materials, wall thicknesses, electric installations and circuitry, water pipes, fire extinguishers, emergency exits, window locations, machine performance parameters, machine sensor and valve locations, etc. "Instructions," as used herein, refers to code (e.g., binary code) that is understood by the processor and which represents, on the real-time 3D virtual replica, the behavior of the real world element.

Modeling techniques for converting real objects into real-time 3D virtual replicas with explicit data and instructions and make them available in the persistent virtual world system may be based on readily-available CAD models of the real objects. For example, machine owners may provide to an administrator of the persistent virtual world system, or may input themselves, the already-existing digital CAD models of their machines. Similarly, building owners may provide building information models (BIM) with building details to be stored in the persistent virtual world system in the server, which may include information that may not be visible or easily obtainable via sensing mechanisms. In these embodiments, the owners of these real objects may be responsible for adding the respective real-time 3D virtual replicas into the persistent virtual world system, which may be achieved, for example, through incentive systems or by legal requirements. In some embodiments, the administrators of the persistent virtual world system, government officials, or other relevant authorities, may collaborate with owners of real objects for inputting the real-time 3D virtual replicas into the persistent virtual world system, thereby realizing a faster and more thorough creation of the persistent virtual world system in the server. In other embodiments, radar-imaging, such as synthetic-aperture radars, real-aperture radars, Light Detection and Ranging (LIDAR), inverse aperture radars, monopulse radars, and other types of imaging techniques may be used to map and model real objects before integrating them into the persistent virtual world system. Independent of the modeling techniques used for creating the virtual replicas, the information of each virtual replica should provide sufficient details about each corresponding real world element so that a highly accurate real-time 3D virtual replica of each real world object is available. The real-time 3D virtual replicas, whenever possible, are then enriched and synchronized through the multi-source sensory data. Thus, in some embodiments, a real-time 3D virtual replica includes explicit data and instructions input via the replica editor and multi-source sensory data input via the plurality of IoT sensing mechanisms.

According to an embodiment, the plurality of IoT sensing mechanisms mounted on the real objects and user devices comprise one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. By providing a plurality of connected elements with sensory mechanisms constantly capturing data from the real world, the persistent virtual world system stored in the server and each of the real-time 3D virtual replicas are kept updated with real-time, multi-source sensory data that mirror the conditions of the real world.

According to an embodiment, the sensing mechanisms attached to the real object or configured in proximity to the real object may include motion capture sensors including optical sensors and inertial sensors, or combinations thereof. The optical tracking sensing mechanisms can make use of marker tracking or markerless tracking. In marker tracking, a real object is fitted with markers. The markers may be sources of active and passive infrared light. Active infrared light may be produced through infrared light sources that may periodically or constantly emit flashes of infrared light. The passive infrared light may refer to infrared light retro-reflectors that reflect infrared light back to a source. One or more cameras are configured to constantly seek the markers and then the server can make use of algorithms to extract the position of the real object and the various parts from the markers. The algorithms may also need to contend with missing data in case one or more of the markers is outside of the camera view or is temporarily obstructed. In markerless tracking, cameras continuously search and compare the image of the real object to the image of the real-time 3D virtual replica stored and computed on the server. The inertial tracking sensing mechanisms can make use of devices such as accelerometers and gyroscopes, which may be integrated in an inertial measuring unit (IMU). Accelerometers measure linear acceleration, which can be integrated to find the velocity and then integrated again to find the position relative to an initial point. Gyroscopes measure angular velocity, which can be integrated as well to determine angular position relative to the initial point. In order to increase accuracy of tracking of the plurality of data points, sensor fusion techniques that employ combinations of optical and inertial tracking sensors and algorithms may be employed.

In yet further embodiments, one or more transceivers may be implemented to receive and send communication signals from and to antennas. Preferably, the transceivers are mmW transceivers. In embodiments where 5G antennas are employed, the mmW transceivers are configured to receive mmW signals from the antennas and to send the data back to the antennas. Thus, in another embodiment of sensor fusion techniques, the optical sensors, inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of real objects. The sensing mechanisms and software required to enable this sensing fusion technique may be referred to herein as a tracking module. The user devices may also include a tracking module fusing inertial tracking from one or more IMU as well as mmW transceivers. In further embodiments, the sensor fusion further enables receiving positioning data from GNSS tracking signals and augmenting this data with the mmW signals and inertial tracking in order to provide an accurate position and orientation. In some embodiments, tracking may be performed employing several techniques known in the art, such as time of arrival (TOA), angle of arrival (AOA), or other tracking techniques known in the art (e.g., visual imaging, radar technology, etc.).

In some embodiments, synchronizing the real objects with the real-time 3D virtual replicas through the sensing mechanisms connected to the server via the network further provides feedback to the real-time 3D virtual replica in order to enhance the real-time 3D virtual replica and provide further physical properties of the corresponding real object. In other embodiments, this synchronization further enables the implementation of virtual enhancements or virtual compensations to the real object counterparts. In some embodiments, the virtual enhancements or compensations are enabled through virtual resources, which refer to storage and computing capabilities that are available in the server and which can be shared to the real objects via the network through the implementation of virtual machines. In other embodiments, the virtual enhancements or compensations are enabled through virtual sensors, which refer to utilizing data available virtually which can be used to compensate for missing real data. Virtual sensors may further employ the use of the 3D structure of the virtual world and each of the real-time 3D virtual replicas representing the real world, such that a real object is able to recognize other objects in the real world through their real-time 3D virtual counterpart without needing such an object recognition in the real world.

For example, in a scenario of a factory robot configured to transport materials from one place to another, if a physical visual sensor (e.g., cameras or optical sensors) is either failing or missing in the robot, the robot may use a virtual visual sensor by employing the virtual map of the factory comprising the 3D coordinates and 3D structure of each item in order to detect and accordingly avoid obstacles already located in the persistent virtual world system, such as walls, tables, or other real objects. In another example, a pizza delivery drone can use the virtual model of a city to find the desired destination, and may use the real visual sensors only to detect and avoid objects that may not be in the persistent virtual world system. In an example of a medical application, a doctor may remotely, in virtual or augmented reality, manipulate a real-time 3D virtual replica of a surgical apparatus that has a real counterpart in a surgical room. Other staff (e.g., doctors, nurses, etc.) may view the virtual avatar of the doctor performing the surgery and may assist him as needed. In order to increase accuracy, cameras may capture the real patient and the operations room, which may be integrated in the virtual world version displayed to the remote doctor so that he can view in real-time the situation in the operation room. In another example, a real object may suffer a shortage of computation or storage capacity for specific tasks and may send a request thereof to the server, which may in turn send the required compute and storage to the real object.

In other examples, the real objects refer to other IoT devices apart from the above, comprising surveillance cameras, traffic lights, buildings, streets, train-tracks, home appliances, or any other device that may be connected to a network.

In one embodiment, the users of the at least one real-time 3D virtual replica are human users, artificial intelligence users, or combinations thereof. In another embodiment, the object operators are human object operators, artificial intelligence object operators, or combinations thereof. In these embodiments, the real-time 3D virtual replicas may further comprise virtual bots and virtual avatars of users or object operators. The human avatars may be configured to display the physical characteristics of the human users, or may be configured with a different visual aspect and characteristics.

In some embodiments, the server may be configured to employ artificial intelligence algorithms and group analytics in order to simultaneously and autonomously manage or assist in the management of a plurality of real-time 3D virtual replicas, leading to a corresponding management of the one or more real objects. The management may be performed by, for example, virtual bots stored and computed on the server, which may or may not be connected to a physical bot in the real world. In another embodiment, robots may be configured to manage the one or more real objects, whereby the management or manipulation instructions are transferred in real-time to the corresponding real-time 3D virtual replicas of the real objects through the persistent virtual world system stored and computed on the server. In these embodiments, the server may further be configured to employ artificial intelligence algorithms to enable a plurality of real-time 3D virtual replicas to cooperate and interact with each other based on one or more goals. Thus, although the real objects may have limited communication with each other in the real world, the plurality of real-time 3D virtual replicas may closely cooperate and interact in the virtual world, resulting in a corresponding interaction and cooperation in the real world.

According to an embodiment, in order to enable a natural interface and enhanced experience with the real object through a real-time 3D virtual replica, the physical properties and real-world coordinates of the real-time 3D virtual replica are configured to be correspond to those of the real object. The physical properties may include, without limitations, dimensions, texture, mass, volume, refractive index, hardness, color, pressure, and temperature. The data of each of the real-time 3D virtual replicas may be arranged in an accurate data structure. The real-world coordinates may include current positional (e.g., coordinates in three dimensions) and orientational data (e.g., angles in three dimensions) of the real object. Configuring the physical properties and real-world coordinates of the real-time 3D virtual replica based on the real object may serve not only for increasing the realism of the objects as displayed to users, but also to facilitate an accurate control of the objects with 6 degrees of freedom because each part of the real object may be accurately represented in the real-time 3D virtual replica The representation of spatial data is an important issue in the programming of the persistent virtual world system, involving the renderization and display of computer graphics, visualization, solid modeling, and related areas. The data structure used to represent the persistent virtual world system and each of the real-time 3D virtual replicas comprises, without limitations, one or more of octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures.

According to an embodiment, effecting one or more changes on the real object via the real-time 3D virtual replica, or on the real-time 3D virtual replica via the real object, includes applying modifications on the plurality of data points shared between the virtual and real pair. In some embodiments, the modifications applied on the plurality of data points includes one or more of a rotation motion, translation motion, selection of one or more behaviors, programming of one or more behaviors, configuration of one or more parameters, or combinations thereof. The modifications may be applied directly on the real object to cause a real-time, ground truth experience effect on the real-time 3D virtual replica. Similarly, the modifications may be applied directly on the real-time 3D virtual replica to cause a real-time, ground truth experience effect on the real object.

In some embodiments, manipulating the at least one real object via a real-time 3D virtual replica requires a prior virtual selection of the real-time 3D virtual replica, enabled through a 3D user interface, sending a selection instruction to the selected real-time 3D virtual replica and to the corresponding real object. The virtual selection and manipulation instructions for effecting a change on the real object via the real-time 3D virtual replica may, in some embodiments, be provided via a natural user interface (NUI) provided by a user device. For example, a user may interact with the real-time 3D virtual replica via the NUI free from artificial constraints imposed by input devices such as mice, keyboards, remote controls, and the like, such as through speech recognition, touch recognition, facial recognition, stylus recognition, air gestures (e.g., hand poses and movements and other body/appendage motions/poses), head and eye tracking, voice and speech utterances, and machine learning related to, e.g., vision, speech, voice, pose, and/or touch data. In other embodiments, the manipulation instructions for effecting a change on the real object via the real-time 3D virtual replica may, as well, be provided via common user interfaces imposing artificial constraints, such as mice, keyboards, remote controls, and the like. In any case, user real-time 3D-based interactions with the real-time 3D virtual replica may be provided through one or more user devices, such as mobile phones, laptops, mobile game consoles, head-mounted displays, cross cockpit collimated displays, head-up displays, and smart contact lenses, amongst others. Moreover, the real-time 3D-based interactions via the user interface may be provided in one or more of an augmented reality, virtual reality, mixed reality, or combinations thereof.

In some embodiments, user devices and real objects may refer to the same device. For example, a land vehicle may refer to a real object that can be controlled by a real or artificial intelligence user. However, the vehicle may include augmented reality user interfaces (e.g., on the windshield or windows) that can allow a user to interact with the vehicle, send commands to a self-driving artificial intelligence system, or even control the vehicle itself through such interfaces, thus allowing the car to act as a user device.

In an exemplary embodiment, the real object may refer to a factory machine, such as one or more industrial robots used for painting, welding, assembling, packaging, labeling, pick and place (e.g., for printed circuit boards), etc. In another exemplary embodiment, the real object may refer to a vehicle, including aerial vehicles (e.g., planes, drones, helicopters, etc.), land vehicles (e.g., cars, motor bikes, trucks, etc.), and sea vehicles (e.g., boats, cargo ships, submarines, etc.). Two-way real-time 3D-based interaction and management of industrial machines may be useful for remotely managing a plurality of industrial machines in real time while being able to monitor changes taking place in any part of a manufacturing plant. Two-way real-time 3D-based interaction and management of vehicles may be useful to, for example, governmental organizations to have a better control of running vehicles in cases that require traffic to move in certain manner, such as during accidents or natural disasters when ambulances are required to go through heavy traffic.

A method for enabling two-way interactive operations of real-time 3D virtual replicas and real objects includes providing a persistent virtual world system comprising a 3D structure defining at least one real-time 3D virtual replica of at least one real object; synchronizing the at least one real-time 3D virtual replica with the corresponding at least one real object through (IoT) sensing mechanisms, which sends feedback back to the real-time 3D virtual replica for enhancing and updating the real-time 3D virtual replica model, increasing accuracy and providing certain physical properties to the real-time 3D virtual replica based on the synchronization; receiving selection and/or manipulation instructions input through either of the real object or user device; processing and executing the selection and/or manipulation instructions; and updating the persistent virtual world system with the at least one modified real-time 3D virtual replica and sending the updated model to the corresponding user devices. In some embodiments, some of the processing may be used to support processing performed locally by the real object.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
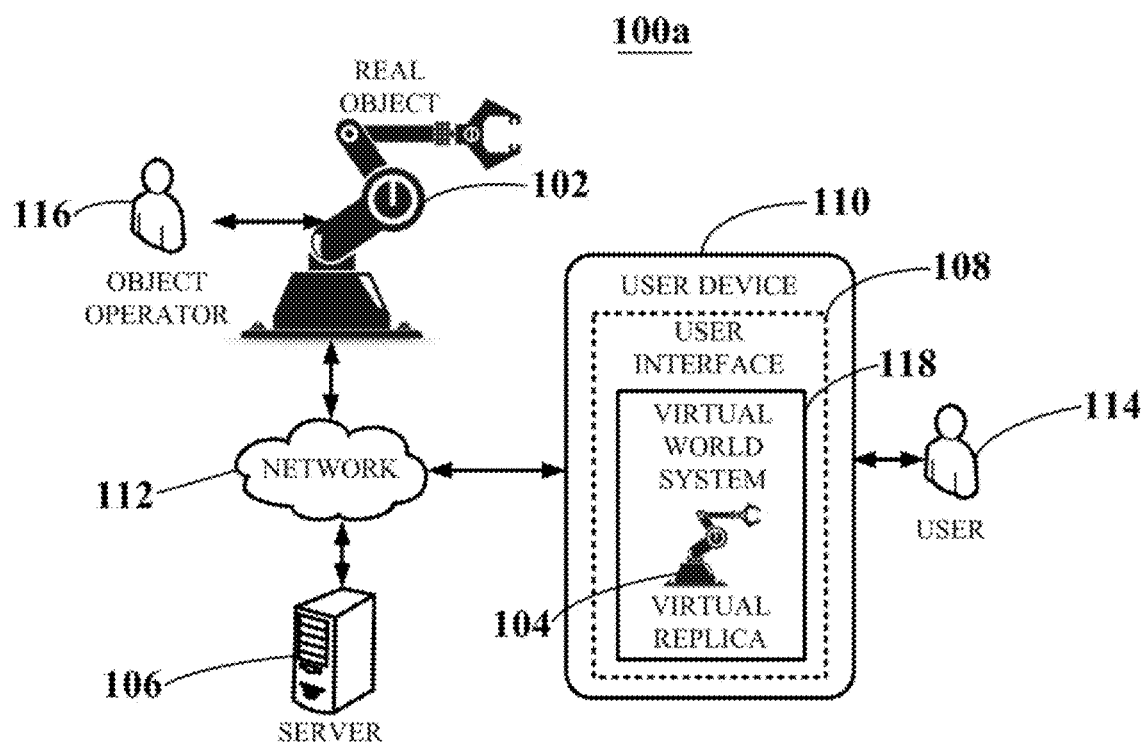
FIGS. 1A-1B depict schematic representations of a system enabling a two-way operation of real-time 3D virtual replicas and real objects, according to an embodiment of the present disclosure.
Figure 1B:
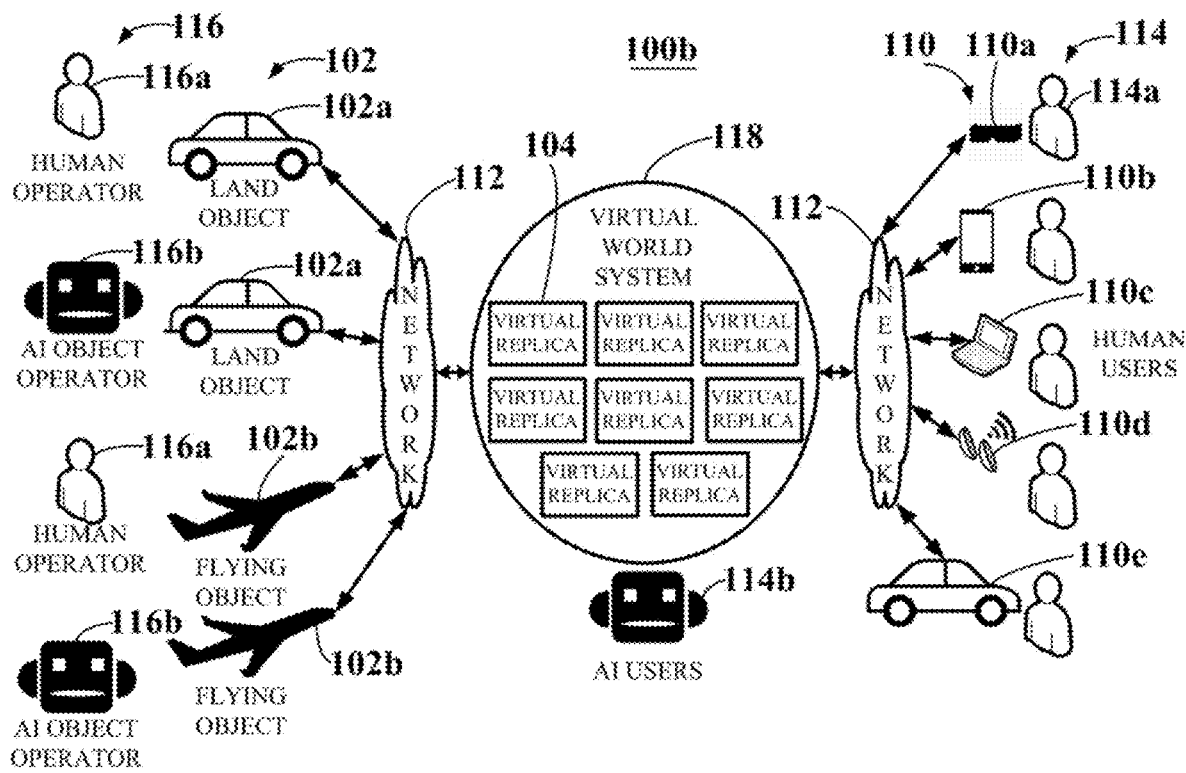

FIGS. 1A-1B depict schematic representations of systems 100a-b enabling a two-way operation of real-time 3D virtual replicas and real objects, according to an embodiment of the present disclosure. In FIG. 1A, a real object 102 is communicatively and persistently connected and fully synchronized to a real-time 3D virtual replica 104 stored and computed on a server 106 and displayed via a user interface 108 from a user device 110. The real object 102, server 106, and user device 110 are communicatively connected via a network 112.

In the exemplary embodiment of system 100a in FIG. 1A, a user 114 may employ the user device 110 to enable a real-time and low-latency remote virtual selection and manipulation of the real object 102 via the real-time 3D virtual replica 104. The user 114 may be a human user (e.g., a remote manufacturing plant operator or manager, a remote vehicle operator, a home owner, a city manager, etc.) or an artificial intelligence (AI) user (e.g., software and/or hardware adapted and trained through artificial intelligence algorithms in order to autonomously operate the real-time 3D virtual replica 104 for effecting changes upon the real object 102). Upon selecting and effecting one or more changes on the real-time 3D virtual replica 104, the user device 110 sends selection and manipulation instructions to the server 106, which may, in real time, process the selection and manipulation instructions and transmit the instructions to the respective actuators of the real object 102 in order to produce desired effects on effectors. Effectors refer to any device that affects the environment of a real object 102, such as legs, wheels, arms, or fingers of a robot. Actuators are the mechanisms that enable the effectors to execute an action, and may include electric motors, hydraulic cylinders, pneumatic cylinders, or combinations thereof. In some situations, for example, when the real object 102 has many degrees of freedom due to a high number of joints, one actuator may be required to be placed at each joint of the real object 102 in order to enable the required rotation and translation motion that may provide the desired degrees of freedom per joint. The processed instructions are also sent to the user device 110, which may only need to perform lightweight operations on the media content required to adequately represent the updated real-time 3D virtual replica 104 on the user devices 110.

In another exemplary embodiment of system 100a in FIG. 1A, an object operator 116 (e.g., an industrial machine operator) may directly manipulate the real object 102 to enable a real-time and low-latency remote update of the real-time 3D virtual replica 104 stored and computed on the server 106. The object operator 116 may be a human object operator or an AI object operator. User interfaces enabling a direct manipulation of the real object 102 may depend on the nature of the real object 102, and may include one or more screens, buttons, pedals, or other controlling mechanisms. Upon effecting one or more changes on the real object 102, the real object 102 shares, in real-time, the instructions with the server 106. The real object 102, simultaneously, processes and executes the instructions. The server 106 may thereafter, in real time, process the manipulation instructions required to update the real-time 3D virtual replica in a way that is identical to the actions performed by the real object 102. In some embodiments, processing performed by the server 106 is complementary of the processing performed by the real object 102, serving as a support to the real object 102 for performing certain heavy task processing. The server 106 may accordingly update the real-time 3D virtual replica 104 and send the updated real-time 3D virtual replica 104 to the user devices 110. In some embodiments, most heavy-load processing is performed in the server 106, so that the user devices 110 may only need to perform lightweight operations required to represent the updated real-time 3D virtual replica 104 on the user devices 110.

According to an embodiment, after the real-time 3D virtual replica 104 is generated, stored and computed on the server 106, the real-time 3D virtual replica 104 may be synchronized with the real object 102 through a combination of sensing mechanisms attached to the real object 102, placed in proximity to the real object 102, or combinations thereof. Some of the sensing mechanisms may be attached to effectors, joints, connectors, and actuators of the real object 102. The combination of sensing mechanisms may provide a plurality of data points that may be shared between the real object 102 and the real-time 3D virtual replica 104 via the network 112. The shared data points may enable an accurate synchronization between the real object 102 and real-time 3D virtual replica 104, along with an accurate tracking of the real object 102.

According to an embodiment, in order to enable a natural user interface 108 and enhanced experience with the real object 102 through the real-time 3D virtual replica 104, the physical properties along with real-world positional and orientational data of the real-time 3D virtual replica 104 are configured to correspond to those of the real object 102 through the shared data points. Configuring the physical properties and real-world positional and orientational data of the real-time 3D virtual replica 104 based on the real object 102 may serve not only for increasing the realism of the objects as displayed to users 114, but also to enable an accurate control of the objects with 6 degrees of freedom via the real-time 3D virtual replica, which may be reflected as a life-like manipulation of the real object through the real-time 3D virtual replica.

According to an embodiment, effecting one or more changes on the real object 102 via the real-time 3D virtual replica 104, or on the real object 102 via the real-time 3D virtual replica 104, includes applying modifications on the plurality of data points shared between the real-time 3D virtual replica 104 and real object 102. In some embodiments, the modifications applied on the plurality of data points further include one or more of a rotation motion, translation motion, selection of one or more behaviors, programming of one or more behaviors, configuration of one or more parameters, or combinations thereof. The modifications may be applied directly on the real object 102 to cause a real-time, ground truth experience effect on the real-time 3D virtual replica 104. Similarly, the modifications may be applied directly on the real-time 3D virtual replica 104 to cause a real-time, ground truth experience effect on the real object 102.

In some embodiments, manipulating the at least one real-time 3D virtual replica 104 or the corresponding at least one real object 102 generates a change on contextual data affecting the virtual-real pair, wherein such a change in the contextual data may affect the relationships between real-time 3D virtual replicas 104 and corresponding at least one real object 102. For example, adjusting the temperature of an air conditioner via the real object 102 or its virtual counterpart has a direct effect in the temperature surrounding the air conditioner as well as on the real objects 102 in the environment. In another example, instructing a lift truck in a factory to transport a heavy load from one area to another one may trigger other objects on the way to clear the way for the lift truck. In another example, when a street light changes to green, other vehicles, which from the perspective of the street light are part of the context, may automatically start moving as a result of the change in lights.

In some embodiments, manipulating the at least one real object 102 via a real-time 3D virtual replica 104 requires a prior virtual selection of the real-time 3D virtual replica 104, enabled through a 3D user interface, sending a selection instruction to the selected real-time 3D virtual replica 104 and to the corresponding real object 102. The virtual selection and manipulation instructions for effecting a change on the real object 102 via the real-time 3D virtual replica 104 may, in some embodiments, be provided via a natural user interface 108 (NUI) implemented in the user devices 110. For example, a user may interact with the real-time 3D virtual replica 104 via the NUI free from artificial constraints imposed by input devices such as mice, keyboards, remote controls, and the like, such as through speech recognition, touch recognition, facial recognition, stylus recognition, air gestures (e.g., hand poses and movements and other body/appendage motions/poses), head and eye tracking, voice and speech utterances, and machine learning related to, e.g., vision, speech, voice, pose, and/or touch data. In other embodiments, the manipulation instructions for effecting a change on the real object 102 via the real-time 3D virtual replica 104 may, as well, be provided via common user interfaces imposing artificial constraints, such as mice, keyboards, remote controls, and the like. In any case, user real-time 3D-based interactions with the real-time 3D virtual replica 104 may be provided through one or more user devices 110, including mobile phones, laptops, mobile game consoles, head-mounted displays, cross cockpit collimated displays, head-up displays, and smart contact lenses, amongst others. Moreover, the real-time 3D-based interactions via the user interface 108 may be provided in one or more of an augmented reality, virtual reality, mixed reality, or combinations thereof.

According to an embodiment, the real-time 3D virtual replica 104 is part of a broader, persistent virtual world system 118 stored and computed on the server 106, the persistent virtual world system 106 comprising a data structure in which a plurality of other real-time 3D virtual replicas 104 is represented. Thus, any bidirectional commands between real objects 102 and real-time 3D virtual replicas 104, or between real-time 3D virtual replicas 104 and real objects 102 go through the persistent virtual world system 118.

The data structure used to represent the persistent virtual world system 118 and each of the real-time 3D virtual replicas 104 comprises, without limitations, one or more of octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures. The data structure serves the function of accurately and efficiently representing the data of each of the geometries of the virtual objects in the persistent virtual world system. A correct selection of the data structure depends on the origin of the data, the precision of geometries sought for during rendering; whether the rendering is done in real-time or pre-rendered; whether the rendering is performed via the cloud servers, via the user devices, or combinations thereof; the specific applications for which the persistent virtual world system is employed, for example, a higher level of definition may be required for medical or scientific applications than for other types of applications; memory capacities from the servers and from the user devices and thus, desired memory consumption; and the like.

In some embodiments, the network 112 may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

According to an embodiment, the network 112 may comprise antennas configured to transmit and receive radio waves that enable mobile communication between the real objects 102 and with the server. Antennas may be connected through wired or wireless means to computing centers. In other embodiments, the antennas are provided within the computing centers and/or areas near the computing centers. In some embodiments, in order to service user devices 110 and/or real objects 102 located outdoors, the antennas may include millimeter wave (mmW)-based antenna systems or a combination of mmW-based antennas and sub 6 GHz antenna systems, herein grouped as and referred to as 5G antennas. In other embodiments, the antennas may include other types of antennas, such as 4G antennas, or may be used as support antennas for the 5G antenna systems. In embodiments where antennas used for servicing user devices 110 located indoors, the antennas may use Wi-Fi, preferably, but not limited to, providing data at 16 GHz.

In other embodiments, global navigation satellite systems (GNSS), such as GPS, BDS, Glonass, QZSS, Galileo, and IRNSS, may be used for positioning of user devices 110. Employing signals from a sufficient number of satellites and techniques such as triangulation and trilateration, GNSS can calculate the position, velocity, altitude, and time of user devices 110. In a preferred embodiment, the external positioning system is augmented by assisted GNSS (AGNSS) through the architecture of existing cellular communications network for use in positioning systems, wherein the existing architecture comprises 5G. In other embodiments, the AGNSS tracking system is further supported by a 4G cellular communications network positioning systems. In indoor embodiments, the GNSS is further augmented via radio wireless local area networks such as Wi-Fi, preferably, but not limited to, providing data at 16 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of user devices 110 is implemented by a combination of AGNSS and inertial sensors in the user devices 110.

FIG. 1B shows an exemplary embodiment of a system 100b where a plurality of object operators 116, comprising human operators 116a, artificial intelligence (AI) operators 116b, or combinations thereof, operate at least one real object 102, such as one or more land objects 102a (e.g., a vehicle) or flying objects 102b (e.g., a drone or an airplane). The object operators 116 operating the at least one real object 102 send manipulation instructions to said real objects 102 utilizing suitable interfaces on the real objects 102. The manipulation instructions are sent to the respective one or more real-time 3D virtual replicas 104 via the network 112 through the persistent virtual world system 118, continuously and in real-time updating said one or more respective real-time 3D virtual replicas 104 and, if applicable, producing changes in the context data around the respective one or more real-time 3D virtual replicas 104 (e.g., triggering changes or events that affect other real-time 3D virtual replicas 104). Users 114, comprising human users 114a, AI users 114b, or combinations thereof, may observe the continuous and real-time updates of the respective one or more real-time 3D virtual replicas 104 through user devices 110 connected to the persistent virtual world system 118 via the network 112.

Likewise, users 114 may manipulate one or more real-time 3D virtual replicas 104 via user devices 110. The manipulation instructions can be respectively transferred in real-time to the corresponding one or more real objects 102 via the network 112 through the persistent virtual world system 118. Object operators 116 may observe the continuous and real-time updates of the operation of the real objects 102. As appreciated in the illustration of FIG. 1B, a plurality of users 114 simultaneously view the changes in the real-time 3D virtual replicas 104 through several user devices 110 including, without limitations, VR/AR head-mounted displays 110a, mobile phones 110b, laptops 110c, smart contact lenses 110d, and smart vehicles 110e.

For example, a human operator 116a can maneuver a vehicle (e.g., land object 102a), sending commands to the respective real-time 3D virtual replica 104 of the vehicle via the network 112 through the persistent virtual world system 118. One or more users 114 of the persistent virtual world system 118 can view such changes as they take place via the respective one or more real-time 3D virtual replicas 104. In some embodiments, the at least one real-time 3D virtual replica 104 may further comprise virtual bots and avatars of users. The virtual bots may be configured as AI users 114b to respond as automated agents with human or human-like behavior by employing artificial intelligence algorithms and group analytics required for simultaneously and autonomously managing a plurality of real-time 3D virtual replicas 104, wherein managing the one or more real-time 3D virtual replicas 104 leads to a corresponding management of a corresponding real object 102. The virtual bots may or may not be connected to a physical bot in the real world. The human avatars may be configured to display the physical characteristics of the human users, or may be configured with a different visual aspect and characteristics. In another embodiment, artificial intelligence devices, such as robots or machines, or artificial intelligence programs may be configured as AI object operators 116b to manage the one or more real objects 102, whereby the management or manipulation instructions are transferred in real-time to the corresponding real-time 3D virtual replicas 104 of the real objects 102 through the persistent virtual world system 118. Thus, the artificial intelligence devices or program may act as an AI object operator 116b of the one or more real objects 102.

In some embodiments, and as illustrated with the example of the smart vehicle 110e, user devices 110 and real objects 116 may in some cases refer to the same device. For example, a smart vehicle 110e may refer to a real object that can be controlled by a real or artificial intelligence user 114. However, the smart vehicle 110e may include augmented reality user interfaces (e.g., on the windshield or windows) that can allow a user to interact with the vehicle, send commands to a self-driving artificial intelligence system, or even control the vehicle itself through such interfaces, thus making the smart vehicle 110e to act as a user device 112.

In some embodiments, a plurality of real-time 3D virtual replicas 104 may employ artificial intelligence algorithms in order to cooperate and interact with each other based on one or more goals. Thus, although the real objects 102 may have limited communication with each other in the real world, the plurality of real-time 3D virtual replicas 104 may closely cooperate and interact in the persistent virtual world system 118, resulting in a corresponding interaction and cooperation in the real world.

Figure 2A:
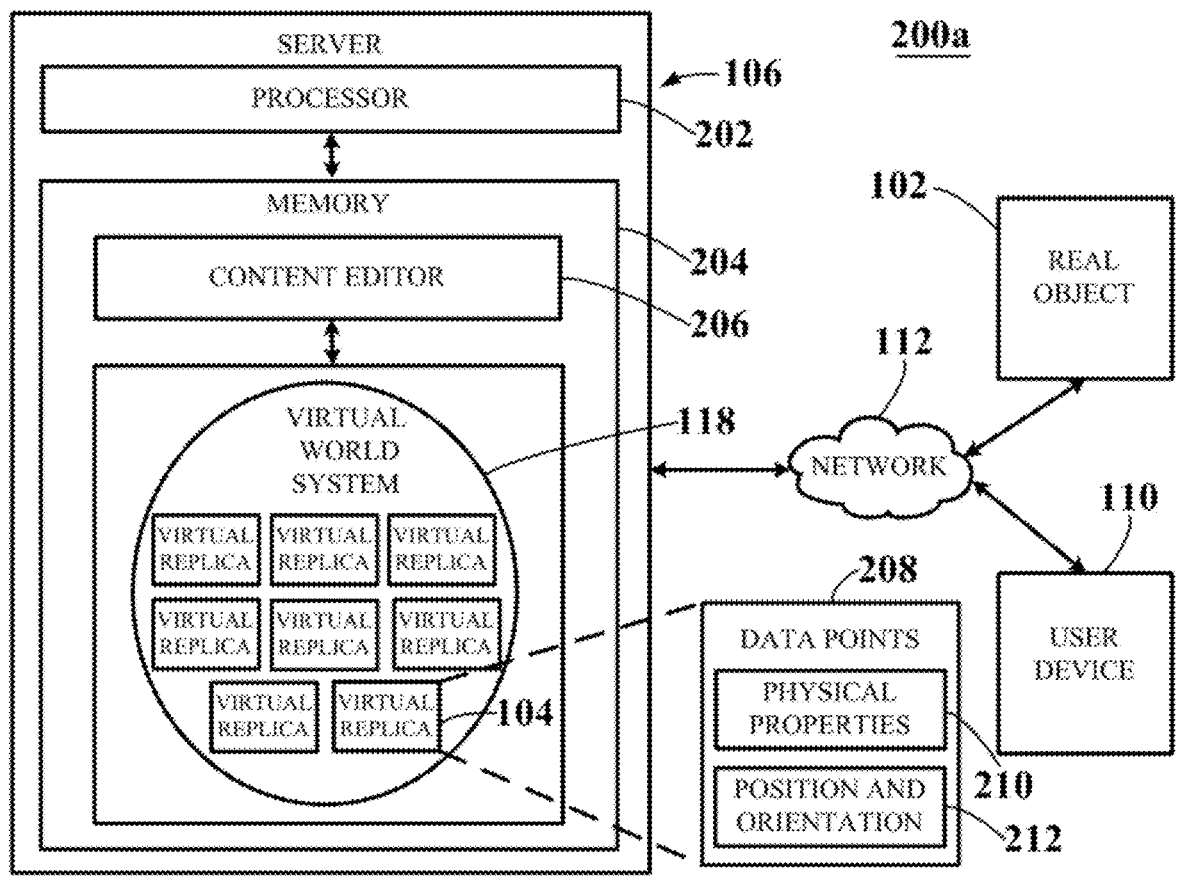
FIGS. 2A-2B depict schematic illustrations of a system according to an embodiment of the present disclosure, detailing a representation of the relationship between the real world and virtual world system.
Figure 2B:
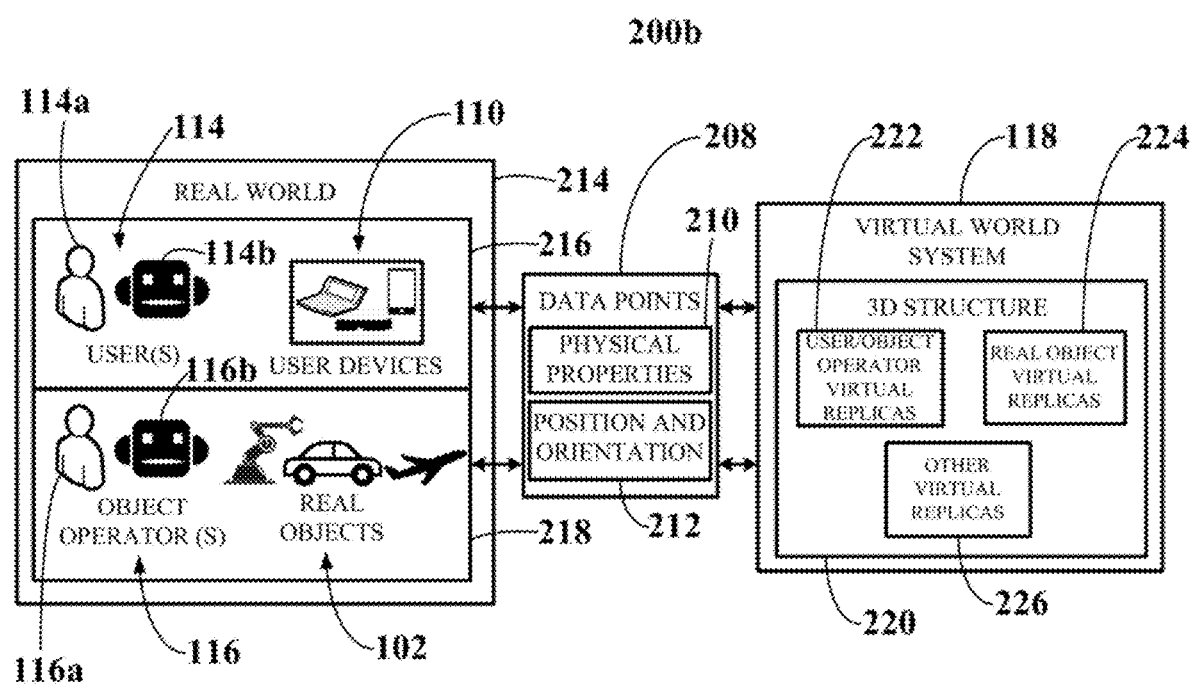

FIG. 2A-2B depict schematic illustrations of systems 200a-b according to an embodiment of the present disclosure, detailing a representation of the relationship between the real world and virtual world system. Some elements of FIGS. 2A-2B may be similar to elements of FIGS. 1A-1B and therefore the same or similar reference numbers may be utilized.

Referring to system 200a in FIG. 2A, the one or more servers 106 may be provided as hardware and software including at least a processor 202 and a memory 204. The processor 202 may be configured to execute instructions included in the memory 204, and the memory 204 is further configured to store instructions and data.

The processor 202 may be configured to access and execute instructions and data included in the memory 204, including real-time processing of manipulation instructions coming from either of the real object 102 or the user device 110. For example, the processor 202 may be configured to implement artificial intelligence algorithms for management of the at least one real object 102 via the corresponding real-time 3D virtual replicas 104, simulations of the real objects 102, 3D structure processing, group analytics, rendering, and implementation of virtual enhancements or virtual compensations of the real objects 102 via the real-time 3D virtual replicas 104. The processor 202 may further enable two-way interactive operations of real objects 102 and real-time 3D virtual replicas 104 by performing kinematic computations on the manipulation instructions. In an embodiment, processing of manipulation instructions by the processor 202 is complementary to the processing performed by the real object 102, serving as a support to real objects 102 for performing certain heavy task processing operations. In other embodiments, the processor 202 further performs rendering of media content comprising video and audio streams that are transmitted to users. The processor 202 may additionally determine two or more media streams to be delivered to user devices based on the user viewing position, orientation, and/or viewing angles. The processor 202 may refer to a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), micro-processors, micro-controllers, and the like.

The memory 204 may store information accessible by the processor 202, including instructions and data, which may be executed by the processor 202. The memory 204 may be of any suitable type capable of storing information accessible by the processor 202, including a computer-readable medium, or other medium that stores data that may be read with the aid of an electronic device, such as a hard drive, memory card, flash drive, ROM, RAM, DVD or other optical disks, as well as other write-capable and read-only memories. The memory 204 may include temporary storage in addition to persistent storage. Instructions may be executed directly (e.g., machine code), or indirectly (e.g., scripts) by the processor 202. The instructions may be stored in object code format for direct processing by the processor 202, or in any other computer language including scripts or collections of independent source code modules that may be interpreted on demand or compiled in advance. Data may be retrieved, stored, or modified by the processor 202 in accordance with the instructions. Data may, for example, be stored in computer registers, in a relational database as a table having a plurality of different fields and records, XML documents, or flat files. The data may also be formatted in any computer-readable format. The memory 204 may store a content editor 206 and a persistent virtual world system 118. The content editor 206 enables users to create and edit real-time 3D virtual replicas 104 of the real objects 102 as well as other objects that may be included in the persistent virtual world system 118, such as objects that may be located in the surroundings of the real objects 102 (e.g., other machines, tables, walls, etc.). The real-time 3D virtual replicas 104 may be further stored in the persistent virtual world system 118 to make them available at the real world location including position and orientation with respect to other real objects 102. The persistent virtual world system 118 may include a virtual version of the real-world comprising real-world position and orientation, scale, dimension, the physical properties, and the 3D structure of real-world objects. However, the persistent virtual world system 118 may also include computer-generated virtual objects that may not exist in the real world, such as objects that are purely virtual.

In some embodiments, the memory 204 may further store events in the persistent virtual world system 118. Storing events may enable, for example, an occurrence detection module (not shown) to detect and replay events for further review. An occurrence refers to a disruption in the typical flow of events. The typical flow of events may be determined within a parameter range or characteristics. In further embodiments, the occurrence is identified via a rule-based system implemented in the server 106. In other embodiments, the occurrence is identified through machine-learning algorithms implemented in the server 106. For example, an occurrence may refer to a vehicle collision, so that the persistent virtual world system 118 may immediately detect a collision that takes place to the real object, which may be later replayed to assist, for example, judicial investigations.

The at least one real-time 3D virtual replica 104 may include a plurality of data points 208 shared with the real object 102, comprising physical properties 210 of the real object 102, along with data points 208 comprising positional and orientational data 212 of the real object 102. The data points 208 and enable a constant tracking and synchronization of manipulation instructions sent through either of the at least one real object 102 or through the at least one corresponding real-time 3D virtual replica 104, and of any change that may take place in either of the real-virtual pair. The data points 208 may be determined via sensing mechanisms including hardware and software mounted on or in proximity to the at least one real object 102.

The physical properties 210 of the real-time 3D virtual replicas 104 of the persistent virtual world system 118 may include, without limitations, dimensions, shape, texture, mass, volume, refractive index, hardness, color, pressure and temperature. The physical properties 210 may be edited through the content editor 206, which may be a computer-aided drawing (CAD) software application. Modeling techniques for converting real-world objects, such as real objects 102 or other objects, to three-dimensional objects may be based on techniques known in the art. For example, machine manufacturers may provide already-existing digital CAD models of the machines which may be integrated in the persistent virtual world system 118. In other embodiments, radar imaging, such as synthetic-aperture radars, real-aperture radars, Light Detection and Ranging (LIDAR), inverse aperture radars, monopulse radars, and other types of imaging techniques may be used to map and model real-world objects before integrating them in the persistent virtual world system 118. In other embodiments, one or more physical properties of the real object 102, such as dimensions, shape, texture, volume, temperature, and color may be directly obtained through sensing mechanisms and edited through the content editor 206.

The real-time processing performed by the processor 202 includes kinematic computations on manipulation instructions received when manipulating the real object 102 via the real-time 3D virtual replica and on manipulation instructions received when manipulating the real-time 3D virtual replica via the real object 102. When processing manipulation instructions received from the real object 102 that may be used to update the real-time 3D virtual replica 104, for example, when moving a mechanical arm via a suitable interface, motion-capture techniques combined with kinematic computations may be used for recreating the movements of the real object 102 in the real-time 3D virtual replica 104.

The motion capture techniques make use of a variety of optical sensing mechanisms, inertial sensing mechanisms, or combinations thereof. The optical tracking sensing mechanisms can make use marker tracking or markerless tracking. In marker tracking, a real object 102 is fitted with markers. The markers may be sources of active and passive infrared light. Active infrared light may be produced through infrared light sources that may periodically or constantly emit flashes of infrared light. The passive infrared light may refer to infrared light retroreflectors that reflect infrared light back to a source. One or more cameras are configured to constantly seek the markers and then the processor 202 can make use of algorithms to extract the position of the real object 102 and the various parts from the markers. The algorithms may also need to contend with missing data in case one or more of the markers is outside of the camera view or is temporarily obstructed. In markerless tracking, cameras continuously search and compare the image of a target, such as a real object 102, to the image of the real-time 3D virtual replica 104 contained in the server 106. The inertial tracking sensing mechanisms can make use of devices such as accelerometers and gyroscopes, which may be integrated in an inertial measuring unit (IMU). Accelerometers measure linear acceleration, which can be integrated to find the velocity and then integrated again to find the position relative to an initial point. Gyroscopes measure angular velocity, which can be integrated as well to determine angular position relatively to the initial point.

In some embodiments, synchronizing the real objects with the real-time 3D virtual replicas through the server 106 enables the implementation by the processor 202 of virtual enhancements or virtual compensations of the real objects 102. In some embodiments, the virtual enhancements or compensations are enabled through virtual resources, which refer to storage and computing capabilities that are available in the server 106 and which can be shared to the real objects 102 via the network 112 through the implementation of virtual machines. In other embodiments, the virtual enhancements or compensations are enabled through virtual sensors, which refer to utilizing data available virtually which can be used to compensate for missing real data. Virtual sensors may further employ the use of the 3D structure of the virtual world and each of the real-time 3D virtual replicas 104 representing the real world, such that a real object 102 is able to recognize other objects in the real world through their real-time 3D virtual replica 104 without needing such an object recognition in the real world. In an embodiment, in order to increase accuracy of tracking of the plurality of data points 208, sensor fusion techniques that employ combinations of optical and inertial tracking sensors and algorithms may be employed. In yet further embodiments, one or more transceivers may be implemented to receive and send communication signals from and to antennas. Preferably, the transceivers are mmW transceivers. In embodiments where mmW antennas are employed, the mmW transceivers are configured to receive mmW signals from the antennas and to send the data back to the antennas. Thus, in another embodiment of sensor fusion techniques, the optical sensors, inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the real object 102. In further embodiments, the sensor fusion further enables receiving positioning data from GNSS tracking signals and augmenting this data with the mmW signals and inertial tracking in order to provide an accurate position and orientation. In some embodiments, tracking may be performed employing several techniques known in the art, such as time of arrival (TOA), angle of arrival (AOA), or other tracking techniques known in the art (e.g., visual imaging, radar technology, etc.).

When manipulating the real-time 3D virtual replica 104 via the real object 102, the processing performed by the processor 202 may further include various operations to enable input coming from the real object 102, update the real-time 3D virtual replica in the server 106, and convert that input into an output video and, optionally, audio stream that are thereafter streamed to the user device 110 to display the updated real-time 3D virtual replica 104. When receiving input from manipulations performed at the real object 102, the processor 202 may perform pre-processing operations of the media content, including sound and video compression and assembling. Sound and video compression may be performed by using an audio codec and video codec, respectively, which is thereafter assembled in a container bitstream. The audio codec can be any encoding technique capable of receiving audio output and generating an audio data stream, such as WMA, AAC, or Vorbis. In some embodiments, the audio codec may support encryption of the audio stream. Similarly, the video codec may be any encoding technique capable of receiving video output and generating a video data stream, such as WMV or MPEG-4. In some embodiments, the video codec may support encryption of the video stream. Other codecs for generating audio or video streams or any streams for other modalities preferably supporting encryption of the related input data stream or allowing for subsequent encryption of the resulting audio or video stream or any stream for another modality may be used as well. The container bitstream may be any suitable bitstream configured to accommodate one or more data streams, such as ASF or ISMA. However, other suitable container bitstreams may be used as well, preferably allowing for a subsequent encryption of the resulting container bitstream.

The processor 202 may additionally determine two or more media streams to be delivered to a user device 110 based on the user device 110 viewing position, orientation, and/or viewing angles; and perform rendering tasks of the media streams. After determining the two or more media streams, the processor 202 may perform media rendering in a way that the user device 110 may only need to perform lightweight computational tasks on the processed media content in order to adequately represent the processed media content to users.

Rendering of media content may include various rendering techniques that may form two or more photorealistic 3D media streams of media representing the real object 102, including but not limited to, warping, stitching and interpolating the two or more media streams. The rendering may include a more complex reconstruction process based on the input stream data. For example, the rendering may rely on a combination of standard image reconstruction techniques, such as stitching, warping, interpolation and extrapolation. For example, extrapolation may be needed in areas where no or limited (visual) information is available based on the available media streams, in order to fill up blanks or holes in the media data. However, it is to be understood that the reconstruction process is not limited to computer vision techniques and may further take into consideration spatial data about the scene, which may include one or more of reconstructed 3D geometry information, parameters about materials, and a light field, which may correspond to a flow of light in the captured scene, and the like, in any combination. The spatial data may be used to re-render the captured scene with 3D rendering techniques. In one or more embodiments, the rendering of the output stream may include using a deep learning technique and/or neural networks that may be applied to recreate images or frames of the output stream from a sequence of images or frames of the media streams of the same scene taken from different viewpoints. This may enable a complex reconstruction and generation of the output stream even if at least a part of the scene is not captured completely or in full detail.

In some embodiments, the processor 202 is not restricted to two-dimensional visual output data from applications, and may, for example, be capable of receiving a stereoscopic output of the application and related commands and producing two video streams or one interlaced video stream, transporting visual data for each respective eye of a user. Similarly, the processor 202 may also be capable of generating an audio stream carrying spatial sound data as well as data streams for other multi-dimensional multi-modal data.

In one embodiment, the plurality of media streams may be further processed such that the quality of the output stream is focused to a position where the viewer is actually looking, such as based on a determined gaze direction, or in the center of a frame. Furthermore, the media streams may be processed in order to enable predicted motion reconstruction or to extrapolate the media streams, including a prediction where the viewer is going to look next and reconstructing this area in advance. Furthermore, additional processing may be applied that takes into account the focusing distance of the eyes (e.g., determined by the relative position and orientation of the pupils) to further improve the quality and fidelity of the output streams. Non-limiting examples are focusing distance dependent shift and parallax effects as well as defocus blurring of those parts of the scene that can be determined to be out of focus for the viewer.

When processing manipulation instructions received from the real-time 3D virtual replica via the user device 110 in order to manipulate the real object 102, the processor 202 may access a number of predefined processing instructions based on available actions depending on the nature of the real object 102, may match the manipulation instructions with the relevant processing instructions, and may send the execution instructions to the respective machine actuators in order to produce an effect on the plurality of effectors. The manipulation instructions may include one or more of rotation motion, translation motion, selection of one or more behaviors, programming of one or more behaviors, configuration of one or more parameters, or combinations thereof. Moreover, because the physical properties of the real object 102 are stored and synchronized in the server 106, the speed and feel of the movement of specific parts of the mechanical arm in the real-time 3D virtual replica are simulated based on the capabilities of the real object 102, and are thus limited to these real life capabilities. In embodiments where manipulation instructions include only translational or rotational movements, the processor 202 may use reverse kinematic computations to process the instructions. Reverse kinematics is typically used to determine the joint parameters that provide a desired position for each of the effectors based on a desired position. In embodiments where manipulation instructions include more complex behaviors involving a plurality of sequential steps (e.g., a robot sitting, standing up, punching, avoiding obstacles, or a mechanical arm performing a pick-and-drop action), processing instructions may employ an integrated combination of forward kinematics and reverse kinematics. Forward kinematics uses equations to compute the position of end effectors from specified values for the joint parameters.

In an exemplary embodiment, the real object 102 may refer to a factory machine, such as one or more industrial robots used for painting, welding, assembling, packaging, labeling, pick and place (e.g., for printed circuit boards), etc. In another exemplary embodiment, the real object may refer to a vehicle, including aerial vehicles (e.g., planes, drones, helicopters, etc.), land vehicles (e.g., cars, motor bikes, trucks, etc.), and sea vehicles (e.g., boats, cargo ships, submarines, etc.). Two-way management of industrial machines may be useful for remotely managing a plurality of industrial machines in real time while being able to monitor changes taking place in any part of a manufacturing plant. Two-way management of vehicles may be useful to, for example, governmental organizations to have better control of running vehicles in cases that require traffic to move in certain manner, such as during accidents or natural disasters when ambulances are required to go through heavy traffic.

By way of example, instructing a mechanical arm to perform one or more actions may involve a user viewing through a mobile device or VR/AR glasses or other head-mounted displays the real-time 3D virtual replica 104 of the mechanical arm in a space including most or all objects available at a workshop where the mechanical arm is located. The user may touch the real-time 3D virtual replica 104 of the mechanical arm in order to remotely and virtually select the mechanical arm via the real-time 3D virtual replica 104, prompting the processor 202 of the server 106 to retrieve a number of options from the memory 204 and send the options to be displayed to the user via the user device 110. The options may include, for example, moving, rotating, and performing a pick-and-drop action. Depending on which option the user selects, the processor 202 may proceed by comparing the manipulation instruction with pre-programmed execution instructions. For simple movement tasks involving only translational or rotational movements, the real-time 3D virtual replica 102 user may select (e.g., by touch, air gestures, by a mouse or button, etc.) the mechanical arm on the user interface, and may perform the desired movements by moving the mechanical arm to a desired position and orientation. Depending on which option the user selects, the processor 202 proceeds to process the instructions and then sends processed instructions to the real object 102 in order to execute them, which may involve activating the required actuators that move the different effectors for enabling the desired movement. In other examples, the processor 202 may perform certain processing tasks on the manipulation instructions, such as tasks requiring heavier computing operations, and may send the pre-processed instructions to the mechanical arm. A processor of the mechanical arm may subsequently perform other processing tasks before executing the instructions. More complex tasks may involve operations on more than one object, such as enabling users to interact with the environment of the mechanical arm. For example, for a pick-and-drop behavior, a user may first touch the mechanical arm, select a pick-and-drop action, select a target object, and select a target location where the object needs to be dropped. The processor 202 subsequently compares the manipulation instructions with available processing instructions, processes the instructions in a logical sequence and proceeds to send the processed instructions for execution on the mechanical arm. The mechanical arm may, as well, perform some processing instructions.

In another example, the user may manipulate the real-time 3D virtual replica 104 to rotate a mechanical arm. The user may touch the mechanical arm to virtually select the mechanical arm via the real-time 3D virtual replica 104 and subsequently rotate the mechanical arm. The processor 202 may process the instructions and may, in real-time, rotate the mechanical arm by sending the respective instructions to the corresponding actuators. However, the speed at which the mechanical arm may be rotated via the real-time 3D virtual replica 104 may be limited to the speed that the mechanical arm may be able to reach taking into account safety factors.

FIG. 2B shows a system 200b further illustrating a relationship between the real world 214 and the virtual world system 116. The real world 214 may include a section 216 comprising a plurality of users 114, which can be human users 114a or AI users 114b, employing one or more user devices 110; and a section 218 comprising object operators 116, which can be human object operators 116a or AI object operators 116b, manipulating one or more real objects 102. Elements of section 216 and section 218 share data points 208 with the persistent virtual world system 118, comprising physical properties 210 and position and orientation 212, so that the data points 208 of the real world 214 correspond to the data points 208 of the persistent virtual world system 118. The real world 214 may further comprise other elements (not shown) not included in sections 216 and section 218, such as elements that do not share data points in real-time with the persistent virtual world system 118 (e.g., because sensory mechanisms such as IoT sensors are not installed on them), but which are included graphically in the persistent virtual world system 118 as they have been input in the server through one or more of a plurality of techniques (e.g., scanning, modeling, detected through cameras, and the like).

The persistent virtual world system 118 arranges in a 3D structure 220 the real-time 3D virtual replicas 104 of the elements in the real world 214, comprising user and/or other object operator virtual replicas 222, real object virtual replicas 224, and other virtual replicas 226 corresponding to other objects.

Any type of manipulation instruction sent from the user devices 110 to the real objects 102 are shared to the real objects 102 through the shared data points 208 via the persistent virtual world system 118, updating in real-time the respective real-time 3D virtual replicas and, if applicable, the context of the virtual replicas and respective real objects 102. Likewise, manipulation instructions sent through the real objects 102 serve to update in real-time the real-time 3D virtual replicas through the shared data points 208, which can be viewed by the one or more users 114a via the respective user devices 110, updating, if applicable the context of the virtual replicas and respective real objects 102.

Figure 3:
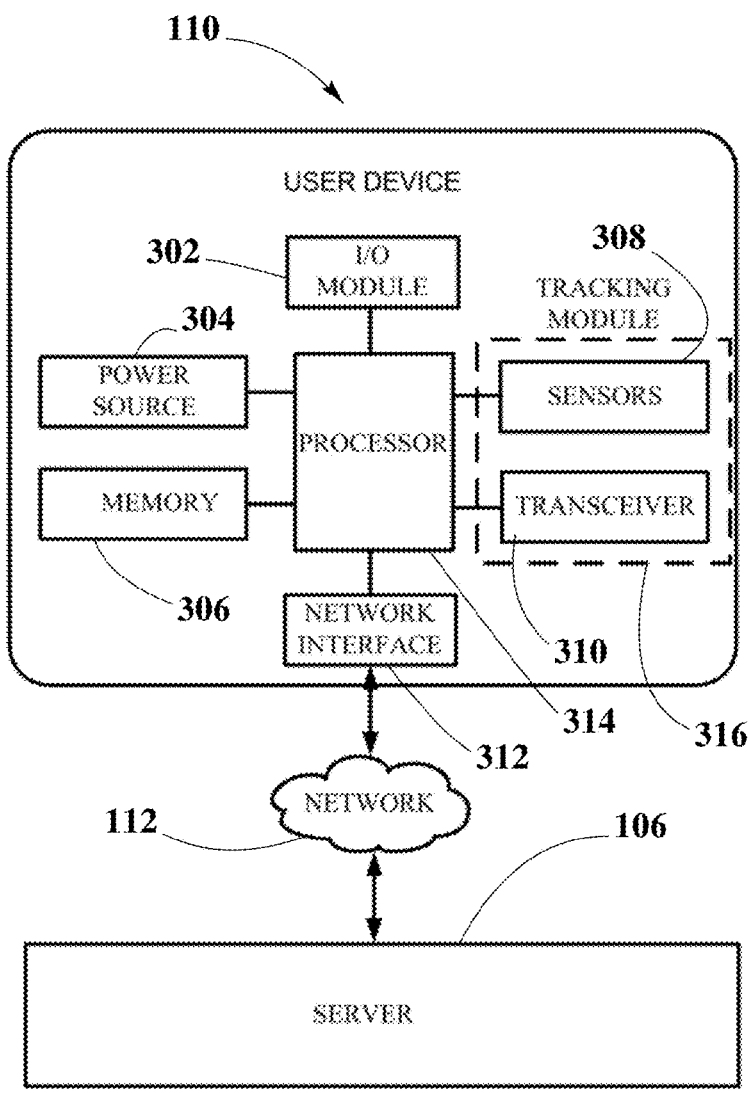
FIG. 3 depicts a schematic illustration of a system according to an embodiment of the present disclosure, detailing a representation of various operational components of user devices.

FIG. 3 depicts a schematic illustration of a system according to an embodiment of the present disclosure, detailing a representation of the operational components of user devices 110. The operational components may include an input/output (I/O) module 302, a power source 304, a memory 306, sensors 308, transceivers 310, and a network interface 312, all operatively connected to a processor 314.

The I/O module 302 is implemented as computing hardware and software configured to interact with users and provide user input data to one or more other system components. For example, I/O module 302 may be configured to interact with users, generate user input data based on the real-time 3D-based interaction, and provide the user input data to the processor 314 before being transferred to other processing systems via network 112, such as server 106. In another example, I/O module 302 is implemented as an external computing pointing device (e.g., a touch screen, mouse, 3D control, joystick, gamepad, and the like) and/or text entry device (e.g., a keyboard, dictation tool, and the like) configured to interact with user devices 110. In yet other embodiments, I/O module 302 may provide additional functions, fewer functions, or different functionality to that described above.

The power source 304 is implemented as computing hardware configured to provide power to the user devices 110. In one embodiment, the power source 304 may be a battery. The power source 304 may be built into the devices or removable from the devices, and may be rechargeable or non-rechargeable. In one embodiment, the devices may be repowered by replacing one power source 304 with another power source 304. In another embodiment, the power source 304 may be recharged by a cable attached to a charging source, such as a universal serial bus ("USB"), FireWire, Ethernet, Thunderbolt, or headphone cable, attached to a personal computer. In yet another embodiment, the power source 304 may be recharged by inductive charging, wherein an electromagnetic field is used to transfer energy from an inductive charger to the power source 304 when the two are brought in close proximity, but need not be plugged into one another via a cable. In another embodiment, a docking station may be used to facilitate charging.

The memory 306 may be implemented as computing software and hardware adapted to store application program instructions and to store telemetry metadata of the devices captured by the sensors 308. The memory 306 may be of any suitable type capable of storing information accessible by the processor 314, including a computer-readable medium, or other medium that stores data that may be read with the aid of an electronic device, such as a hard-drive, memory card, flash drive, ROM, RAM, DVD or other optical disks, as well as other write-capable and read-only memories. The memory 306 may include temporary storage in addition to persistent storage.

The sensors 308 may be implemented as computing software and hardware adapted to obtain various telemetry metadata from users and determine/track the position and orientation of users along with their movements. The sensors 308 may include, for example, one or more of an Inertia Measuring Unit (IMU), accelerometers, gyroscopes, light sensors, haptic sensors, cameras, eye-tracking sensors, and microphones, amongst others. The IMU is configured to measure and report the velocity, acceleration, angular momentum, speed of translation, speed of rotation, and other telemetry metadata of user devices 110 by using a combination of accelerometers and gyroscopes. Accelerometers within the IMU may be configured to measure the acceleration of the real-time 3D-based interaction device, including the acceleration due to the Earth's gravitational field. In one embodiment, accelerometers within the IMU may include a tri-axial accelerometer that is capable of measuring acceleration in three orthogonal directions. The light sensors, haptic sensors, camera, eye-tracking sensors, and microphone may be used to capture input details from a user and his or her environment whenever directly manipulating the real-time 3D virtual replica, which may be transmitted to the server 106 to determine one or more media streams to be delivered to the user device 110 depending on the user's viewing positions and orientations and environmental factors, such as lighting and sounds, as well as enabling voice and haptic-related real-time 3D-based interactions.

The transceivers 310 may be implemented as computing software and hardware configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 310 may be a two-way communication transceiver 310.

In an embodiment, a tracking module 316 may be implemented by combining the capabilities of the IMU, accelerometers, and gyroscopes with the positional tracking provided by the transceivers 310 and the accurate tracking, low-latency and high QOS functionalities provided by mmW-based antennas may enable sub-centimeter or sub-millimeter positional and orientational tracking, which may increase accuracy when tracking the real-time position and orientation of user devices 110. In further embodiments, the tracking module 316 further enables receiving positioning data from GNSS tracking signals and augmenting this data with the mmW signals and inertial tracking in order to provide an accurate position and orientation. In some embodiments, tracking may be performed employing several techniques known in the art, such as time of arrival (TOA), angle of arrival (AOA), or other tracking techniques known in the art (e.g., visual imaging, radar technology, etc.).

The network interface 312 may be implemented as computing software and hardware to communicatively connect to the network 112, receive computer readable program instructions from the network 112 sent by the server 106, and forward the computer readable program instructions for storage in the memory 306 of user devices 110 for execution by the processor 314.

The processor 314 may be implemented as computing hardware and software configured to receive and process user input data. For example, the processor 314 may be configured to provide imaging requests, receive imaging data, process imaging data into environment or other data, process user input data and/or imaging data to generate user real-time 3D-based interaction data, provide server 106 requests, receive server 106 responses, and/or provide user real-time 3D-based interaction data, environment data, and content object data to one or more other system components. For example, the processor 314 may receive user input data from I/O module 302 and may respectively implement application programs stored in the memory 306. In other examples, the processor 314 may receive location, position, or other telemetry metadata from sensors 308 (e.g., information about a user's hand movements, controller manipulation, traveling trajectory, etc.), from transceiver 310, or from combinations thereof. The processor 314 may also be capable of implementing analog or digital signal processing algorithms such as raw data reduction or filtering. The processor 314 may, in certain embodiments, be configured to perform lightweight computational tasks on media content received from the server 106, such as computations required to correctly represent the real-time 3D virtual replica on the user devices 110.

Figure 4:
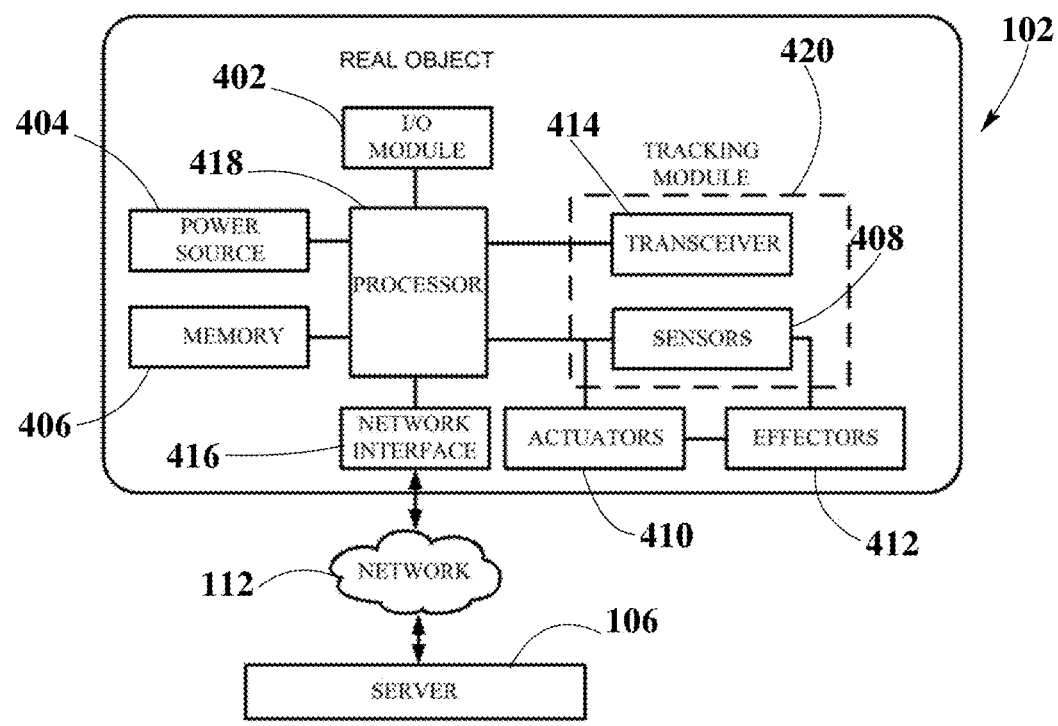
FIG. 4 depicts a schematic illustration of a system according to an embodiment of the present disclosure, detailing a representation of various operational components of real objects.

FIG. 4 depicts a schematic illustration of a system according to an embodiment of the present disclosure, detailing a representation of various operational components of real objects 102. The operational components may include an input/output (I/O) module 402, a power source 404, a memory 406, sensors 408 attached to actuators 410 and effectors 412, transceivers 414, and a network interface 416, all operatively connected to a processor 418.

The I/O module 402 is implemented as computing hardware and software configured to interact with object operators and provide object operator user input data to one or more other system components. For example, I/O module 402 may be configured to interact with object operators, generate user input data based on the real-time 3D-based interaction, and provide the user input data to the processor 418 before being transferred to other processing systems via network 112, such as to server 106. In another example, I/O module 402 is implemented as an external computing pointing devices for selecting objects and options (e.g., a touch screen, mouse, 3D control, joystick, levers, steering wheels, gamepad, and the like) and/or text entry device for inputting manipulation instructions (e.g., a keyboard, buttons, dictation tools, and the like) configured to interact with real objects 102. In yet other embodiments, I/O module 402 may provide additional functions, fewer functions, or different functionality to that described above.

The power source 404 is implemented as computing hardware configured to provide power to the real objects 102, and may follow a similar description as set forth in FIG. 3.

The memory 406 may be implemented as computing software and hardware adapted to store application program instructions and data, and may follow a similar description as set forth in FIG. 3.

The sensors 408 may, for example, be adapted to determine and track the position and orientation of a plurality of actuators 410 and effectors 412 of the real objects 102, to provide data points that may be synchronized and shared with the server 106, and to provide data representations of one or more physical properties of the real object 102 to the server 106. In some embodiments, the sensors 408 may be implemented in other areas of the real object 102 or in areas surrounding the real object 102. For example, sensors 408 may be positioned on a plurality of joints and connectors of a real object 102. Sensors 408 may include, for example, motion capture equipment including optical sensors, inertial sensors, or combinations thereof, which were described with reference to FIG. 2. In other embodiments, other sensors 408 may also be included that may provide data representations of other characteristics of the real object 102, such as thermometers, pressure sensors, humidity sensors, and the like, depending on the nature and functions of the real object 102.

The transceivers 414 may be implemented as computing software and hardware configured to enable real objects 102 to receive wireless radio waves from antennas and to send the data back to the antennas. In some embodiments, mmW transceivers 414 may be employed, which may be configured to receive mmW wave signals from antennas and to send the data back to antennas when interacting with immersive content. The transceiver 414 may be a two-way communication transceiver 414.

In an embodiment, a tracking module 420 may be implemented by combining the capabilities of the IMU, accelerometers, and gyroscopes with the positional tracking provided by the transceivers 414 and the accurate tracking, low-latency and high QOS functionalities provided by mmW-based antennas may enable sub-centimeter or sub-millimeter positional and orientational tracking, which may increase accuracy when tracking the real-time position and orientation of real objects 102. In further embodiments, the tracking module 420 further enables receiving positioning data from GNSS tracking signals and augmenting this data with the mmW signals and inertial tracking in order to provide an accurate position and orientation. In some embodiments, tracking may be performed employing several techniques known in the art, such as time of arrival (TOA), angle of arrival (AOA), or other tracking techniques known in the art (e.g., visual imaging, radar technology, etc.).

The network interface 416 may be implemented as computing software and hardware to communicatively connect to the network 112, receive computer readable program instructions from the network 112 sent by the server 106, and forward the computer readable program instructions for storage in the memory 406 of devices for execution by the processor 418.

The processor 418 may be configured to process manipulation instructions directly input via the I/O module 402 or coming from the server 106 and send the processed instructions to actuators 410 for performing the required movements of effectors 412. For example, the processor 418 may receive user input data from I/O module 402 and may respectively implement application programs stored in the memory 406. In other examples, the processor 418 may receive location, position, or other telemetry metadata from sensors 408, from transceivers 414, or from combinations thereof, and send the information to the server 106 to update the real-time 3D virtual replica. The processor 418 may also be capable of implementing analog or digital signal processing algorithms such as raw data reduction or filtering. In some embodiments, the processor 418 may share some computational tasks with the server 106.

Figure 5:
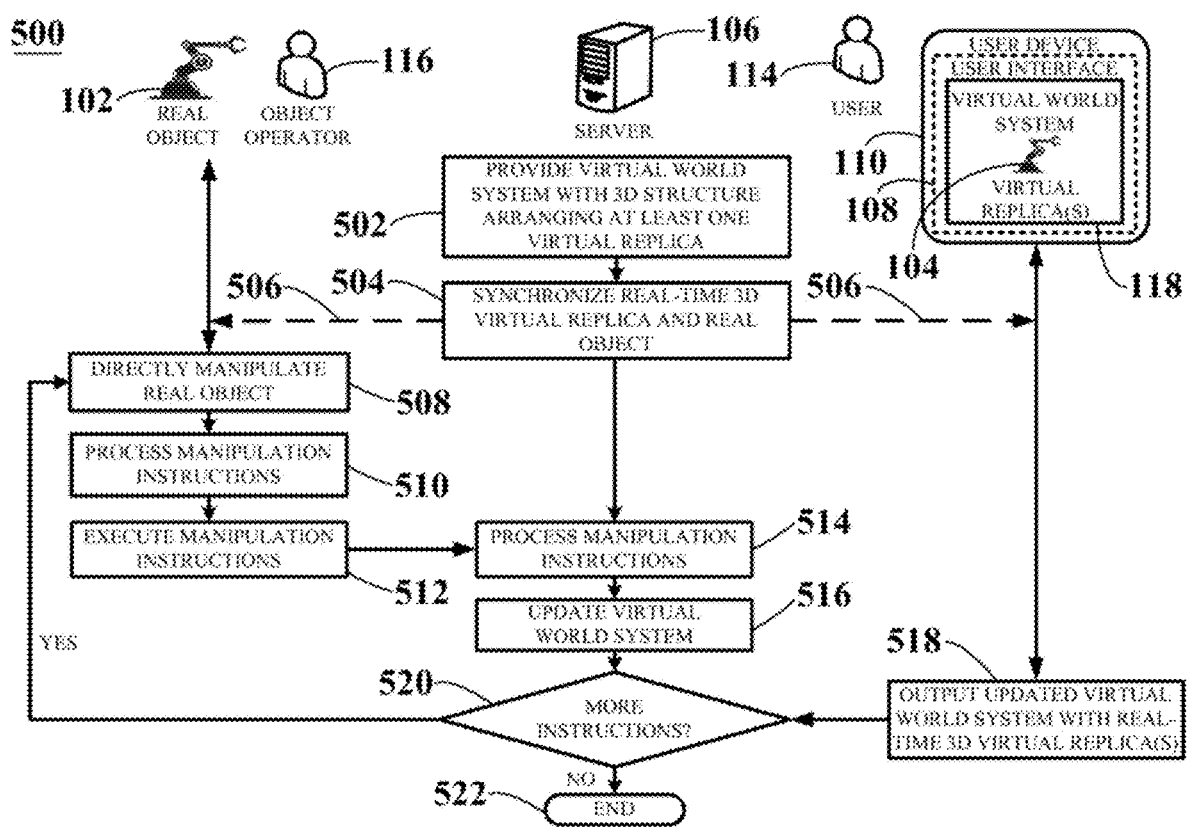
FIG. 5 depicts a flow chart of a method enabling a two-way operation of real-time 3D virtual replicas and real objects when manipulating a real-time 3D virtual replica through direct manipulation of a real object, according to an embodiment of the present disclosure.

FIG. 5 shows a flow chart of a method 500 according to an embodiment of the present disclosure, detailing the manipulation of a real-time 3D virtual replica 108 via direct manipulation of a real object 102, according to an embodiment. Method 500 may, for example, be executed by a system according to an embodiment of the present disclosure, such as the systems discussed with regard to FIGS. 1A to 4.

Method 500 begins by providing on a server 106 a persistent virtual world system 118 comprising a data structure in which at least one real-time 3D virtual replica 104 of at least one real object 102 is represented, as viewed in block 502. Providing the real-time 3D virtual replica 104 of a real object 102 may involve using a content editor, stored and computed on the server 106, for graphically generating and/or editing the real-time 3D virtual replica 104, including physical properties and real world coordinates in three dimensions of the real object 102. The real-time 3D virtual replica 104 may be accessed by a user 114 via a suitable user interface 108 from a user device 110.

Then, method 500 continues by synchronizing the real-time 3D virtual replica 104 with the real object 104, as viewed in block 504, which may involve obtaining data from a plurality of sensors on different parts of the real object 102, such as actuators, effectors, joints, and connectors, or in areas around the real object 102 (e.g., cameras located close to the real object 102). The plurality of sensors may generate a plurality of data points that are communicated to the server 106 and shared with the real-time 3D virtual replica 104. In some embodiments, the sensors connected to the real object 102 further provide feedback to the real-time 3D virtual replica 104, represented by dashed line 506. The feedback data may provide further physical properties of the real object 102 for enhancing the real-time 3D virtual replica 104 and increasing accuracy of the same with respect to the real object 102. When synchronizing the real-time 3D virtual replica 104 with the real object 102, the server 106 sends the synchronized real-time 3D virtual replica 104 to the real object 102 and to user devices 110 via a network through the persistent virtual world system 118. It is to be understood that, after synchronizing the real-time 3D virtual replica 104 with the real object 102 and user devices 110, actions performed on the real object 102 or on real-time 3D virtual replica 104 have a direct effect on the virtual or real counterpart.

Continuing with the process, an object operator 116 may proceed by directly manipulating the real object 102, as viewed in block 508. In block 510, the real object 102 may proceed by processing the manipulation instructions. For example, with reference to FIG. 4, the object operator 116 may input, via a suitable I/O module 402, manipulation instructions which may be transferred to the processor 418. The processor 418 may access processing instructions and data in the memory and proceed to process the manipulation instructions from the object operator 116. The processor 418 may further perform kinematic calculations required to determine which joints should be moved in order for effectors to perform a task. Subsequently, method 500 proceeds by the real object 102 executing the manipulation instructions, as viewed in block 512. Executing the instructions may involve sending electrical signals to a plurality of actuators for activation in order to move effectors that are needed to perform a desired task by the real object 102.

Because the systems are synchronized, manipulating the real object 102 in block 508 sends manipulation instructions to the server 106. After receiving the manipulation instructions, the server 106 may also perform processing tasks on the instructions, as viewed in block 514, such as kinematic computations used for recreating the movements of the real object 102 in the real-time 3D virtual replica 104, as well as rendering tasks in order to send a video and audio stream to user devices 110. Processing the manipulation instructions by the server 106 may further comprise receiving and processing the position and orientation of the object operator through the real object 102, and of the user 114 through the user devices 110. In some embodiments, the processing performed at the server 106 is complementary of the processing performed at the real object 102. Thus, the real object 102 may perform part of the processing instructions while the server 106 may support the real object 102 by performing heavier task computations.

After the server 106 processes the manipulation instructions in block 514, method 500 continues by the server 106 updating the persistent virtual world system with the at least one modified real-time 3D virtual replica 104, as viewed in block 516, which is synchronized at the user device 110. In step 518, the user device 110 continues by outputting the updated persistent virtual world system 118 comprising the real-time 3D virtual replicas 104 that may have suffered a change, which may comprise performing lightweight operations on the received media stream in order to appropriately display the updated real-time 3D virtual replica 104. The method 500 then checks, in check 520, whether there are more manipulation instructions coming from the real object 102, in which case the method 500 loops back to block 508 by the object operator 116 manipulating the real object 102. If there are no more instructions, the process may end, as viewed in terminator 522.

Figure 6:
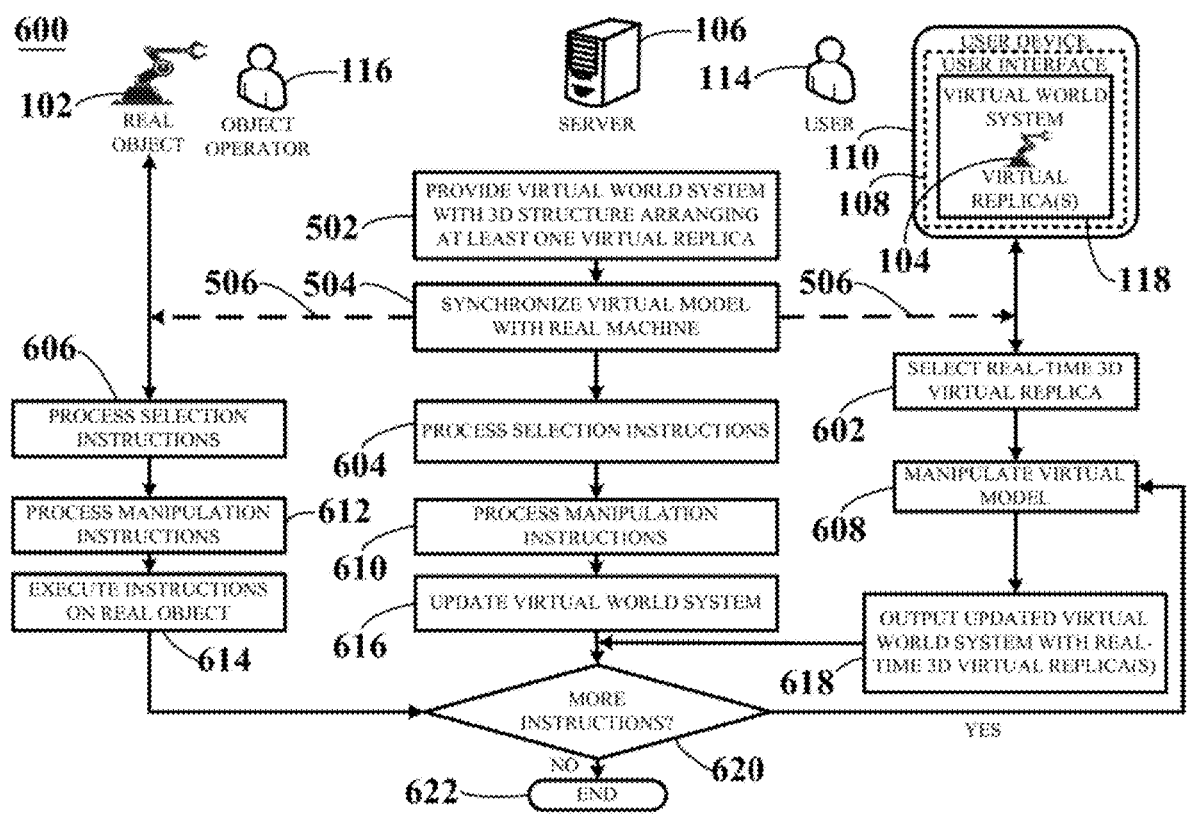
FIG. 6 depicts a flow chart of a method enabling a two-way operation of real-time 3D virtual replicas and real objects when manipulating a real object through manipulation of a real-time 3D virtual replica, according to an embodiment of the present disclosure.

FIG. 6 shows a flow chart of a method 600 according to an embodiment of the present disclosure, detailing the manipulation of a real object 102 via direct manipulation of a real-time 3D virtual replica 104. Method 600 may, for example, be executed by a system according to an embodiment of the present disclosure, such as the systems discussed with regard to FIGS. 1A to 4. Some steps depicted in FIG. 6 correspond to steps shown in FIG. 5, for which similar numerals and reference to those descriptions may be used in FIG. 6.

The initial part of method 600 is the same as that of method 500. Thus, method 600 shares blocks 502 and 504 as well as dashed lines 506 with method 500. Method 600 continues by a user 114 virtually selecting a real-time 3D virtual replica 104 via a suitable user interface 108 from the user device 110, as viewed in block 602, and then by sending selection instructions to the selected real-time 3D virtual replica 104 and to the corresponding real object 102 via the server 106. In some embodiments, the selection instructions sent by the user device 110 to the server 106 comprise position and orientation data of the one or more users 114. The server 106 and real object 102 may proceed, respectively in blocks 604 and 606, by processing the selection instructions. The method 600 proceeds by the user 114 manipulating the real-time 3D virtual replica 104, as viewed in block 608, and then by the server 106 and real object 102 processing the manipulation instructions, respectively in blocks 610 and 612. The processing performed at the server 106 is, in some embodiments, complimentary of the processing performed at the real object 102, and thus may support the real object 102 by performing heavier-task computations.

Subsequently, the real object 102 proceeds in block 614 by executing the instructions on the real object 102. Simultaneously, the server 106 may update the persistent virtual world system with the at least one modified real-time 3D virtual replica 104, as viewed in block 616. The user device 110 may then proceed by outputting the updated persistent virtual world system 118 comprising the real-time 3D virtual replicas 104 that may have suffered a change, which may comprise performing lightweight operations on the received media stream in order to appropriately display the updated real-time 3D virtual replica 104 on the user device 110, as viewed in block 618.

The method 600 then checks, in check 620, whether there are more manipulation instructions coming from the user devices 110, after which the method 600 loops back to block 608 by the user 114 continuing to manipulate the real-time 3D virtual replica 104 via the user device 110. If there are no more instructions, the process may end, as viewed in terminator 622.

Figure 7:
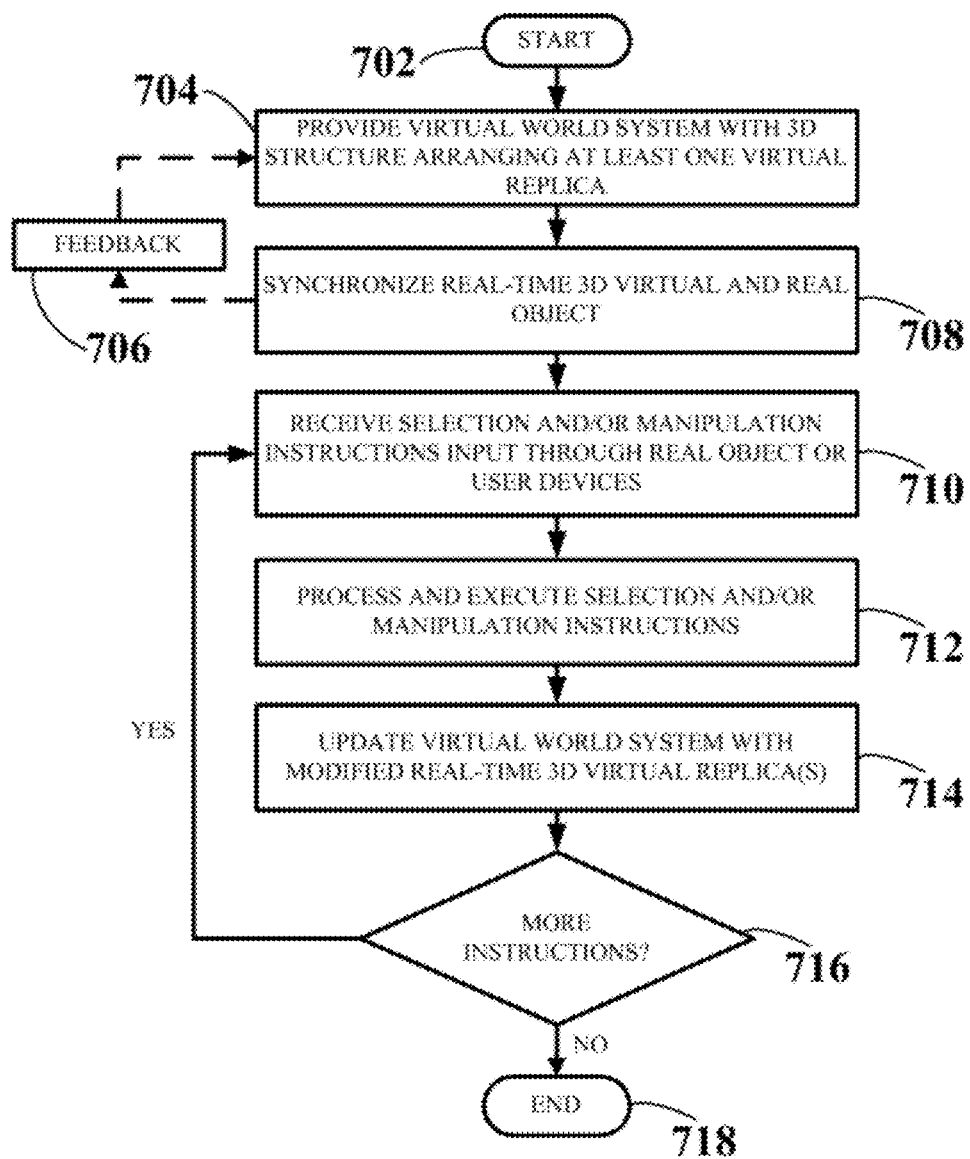
FIG. 7 shows a flow chart of a server-implemented method according to an embodiment of the present disclosure, detailing a two-way operation of real-time 3d virtual replicas and real objects, according to an embodiment.

FIG. 7 depicts a flow chart of a server-implemented method 700 according to an embodiment of the present disclosure enabling a two-way operation of real-time 3D virtual replicas and real objects, according to an embodiment of the present disclosure. Method 700 may, for example, incorporate method 500 for manipulating a real-time 3D virtual replica via direct manipulation of a real object depicted in FIG. 5 and method 600 for manipulating a real object via direct manipulation of a real-time 3D virtual replica depicted in FIG. 6. In some embodiments, method 700 may be executed by a system according to an embodiment of the present disclosure, such as the systems discussed with regard to FIGS. 1A to 4.

Method 700 may start in steps 702 and 704 by providing a persistent virtual world system comprising a 3D structure defining at least one real-time 3D virtual replica of at least one real object. Then, in block 706, method 700 continues in block 708 by synchronizing the at least one real-time 3D virtual replica with the at least one corresponding real object, which sends feedback back to the real-time 3D virtual replica for enhancing the real-time 3D virtual replica, increasing accuracy of the real-time 3D virtual replica with respect to the real object, and providing certain physical properties to the real-time 3D virtual replica based on the synchronization. Method 700 proceeds in block 710 by receiving selection and/or manipulation instructions input through either of the real object or user device, and subsequently in step 712 by processing and executing the selection and/or manipulation instructions on the respective real object and real-time 3D virtual replica. In some embodiments, some of the processing by the server may be used to support processing performed locally by the real object. Method 700 continues by updating the virtual world system with the modified one or more real-time 3D virtual replicas stored and computed on server and sending the updated model to the computing devices, as viewed in step 714. The method then checks, in check 716, whether there are more instructions, in which case the method 700 goes back to block 710. Otherwise, method 700 may end at terminator 718.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The embodiments of the invention in which an exclusive property or privilege is claimed are defined as follows:

1. A system enabling two-way interactive operations of real-time 3D virtual replicas and real objects, the system comprising:
  a persistent virtual world system comprising a data structure in which at least one real-time 3D virtual replica of at least one corresponding real object is represented, wherein the persistent virtual world system is stored and computed on a server comprising memory and at least one processor; and
  at least one corresponding real object communicatively and persistently connected to the at least one real-time 3D virtual replica via a network through the persistent virtual world system stored and computed on the server, wherein the at least one corresponding real object includes a plurality of sensing mechanisms in communication with the persistent virtual world system;
  wherein the at least one real-time 3D virtual replica is synchronized to the at least one corresponding real object through the plurality of sensing mechanisms providing a plurality of data points that are shared between the at least one real object and the at least one corresponding real-time 3D virtual replica, and wherein virtual physical properties and virtual world coordinates of the at least one real-time 3D virtual replica correspond to physical properties and real-world coordinates of the at least one corresponding real object.

2. The system of claim 1, wherein virtually selecting a real-time 3D virtual replica and thereafter effecting one or more changes on the real-time 3D virtual replica through at least one user device results in a real-time corresponding effect on the at least one corresponding real object.

3. The system of claim 1, wherein effecting one or more changes on the at least one corresponding real object results in a real-time corresponding effect on the corresponding real-time 3D virtual replica.

4. The system of claim 1, wherein manipulating the at least one real-time 3D virtual replica or the corresponding at least one real object generates a change on contextual data affecting the virtual-real pair.

5. The system of claim 1, wherein the persistent virtual world system is shared by two or more users via the network.

6. The system of claim 1, wherein the synchronization includes providing feedback to the real-time 3D virtual replica in order to enhance the real-time 3D virtual replica and provide further physical properties of the corresponding real object, and wherein the synchronization further enables enhancing the one or more real objects through the corresponding real-time 3D virtual replicas by employing virtual sensors, virtual resources, or combinations thereof.

7. The system of claim 1, wherein changes effected on either of the real-time 3D virtual replica or on the real object comprise a rotation motion, translation motion, selection of one or more behaviors, programming of one or more behaviors, or configuration of one or more parameters, or combinations thereof.

8. The system of claim 1, wherein the server is configured to employ artificial intelligence algorithms and group analytics in order to simultaneously and autonomously manage or assist a user in the management of a plurality of real-time 3D virtual replicas in order to manage a plurality of corresponding real objects, and wherein the artificial intelligence algorithms further enable cooperation and interaction between the real-time 3D virtual replicas based on one or more goals producing a corresponding cooperation between the plurality of corresponding real objects.

9. The system of claim 1, wherein the memory is further configured to store events in the persistent virtual world system, and wherein data from events is used by an occurrence detection module to detect and replay the events for further review.

10. A method enabling two-way interactive operations of real-time 3D virtual replicas and real objects, the method comprising:
  providing, on a server, a persistent virtual world system comprising a data structure in which at least one real-time 3D virtual replica of at least one corresponding real object is represented, wherein virtual physical properties and virtual real-world coordinates of the at least one real-time 3D virtual replica correspond to physical properties and real-world coordinates of the at least one corresponding real object;
  synchronizing the real-time 3D virtual replica with the at least one corresponding real object through a combination of sensing mechanisms providing a plurality of data points shared between the at least one corresponding real object and the real-time 3D virtual replica;
  receiving selection or manipulation instructions input through one or more interfaces on the at least one corresponding real object or at least one user device, the selection or manipulation instructions comprising modifications on the plurality of shared data points, wherein the instructions are sent via a network through the persistent virtual world system stored and computed on the server;
  processing the selection or manipulation instructions; and
  updating the persistent virtual world system comprising the at least one updated real-time 3D virtual replica.

11. The method of claim 10, wherein virtually selecting a real-time 3D virtual replica and thereafter effecting one or more changes on the real-time 3D virtual replica through the at least one user device results in a real-time corresponding effect on the at least one corresponding real object.

12. The method of claim 10, wherein effecting one or more changes on the at least one corresponding real object results in a real-time corresponding effect on the real-time 3D virtual replica.

13. The method of claim 10, wherein manipulating the at least one real-time 3D virtual replica or the at least one corresponding real object generates a change on contextual data of the at least one corresponding real object, affecting relationships between real-time 3D virtual replicas.

14. The method of claim 10, wherein the persistent virtual world system is shared by two or more human users or artificial intelligence users via the network.

15. The method of claim 10, further comprising effecting one or more changes on either of the real-time 3D virtual replica or on the at least one corresponding real object, wherein the one or more changes comprise a rotation motion, translation motion, selection of one or more behaviors, programming of one or more behaviors, or configuration of one or more parameters, or combinations thereof.

16. The method of claim 10, wherein the synchronization enhances the at least one corresponding real object through the corresponding at least one real-time 3D virtual replica by employing virtual sensors, virtual resources, or combinations thereof.

17. The method of claim 10, wherein the at least one corresponding real object is a factory machine or a vehicle.

18. The method of claim 10, further comprising employing artificial intelligence algorithms and group analytics in order to simultaneously and autonomously manage or assist a user in the management of a plurality of real-time 3D virtual replicas in order to manage a plurality of corresponding real objects, and wherein the artificial intelligence algorithms further enable cooperation and interaction between the real-time 3D virtual replicas based on one or more goals producing a corresponding cooperation between the plurality of corresponding real objects.

19. The method of claim 10, further comprising storing in memory of the server events in the persistent virtual world system, wherein data from the events is used by an occurrence detection module to detect and replay the events for further review.

20. A non-transitory computer-readable medium having instructions stored thereon configured to cause one or more computers to perform steps comprising:

providing a persistent virtual world system comprising a data structure in which at least one real-time 3D virtual replica of at least one corresponding real object is represented, wherein the at least one corresponding real object includes a plurality of sensors in communication with the persistent virtual world system, and wherein virtual physical properties and virtual real-world coordinates of the at least one real-time 3D virtual replica correspond to physical properties and real-world coordinates of the at least one corresponding real object;

synchronizing the real-time 3D virtual replica with the at least one corresponding real object through a plurality of data points provided by the plurality of sensors relating to at least one of the physical properties of the at least one corresponding real object;

receiving input through one or more interfaces on the at least one corresponding real object or at least one user device, wherein the input is configured to effect modifications of the plurality of data points; and updating the at least one real-time 3D virtual replica based on the modifications of the plurality of data points.

* * * * *